(12) United States Patent
Geen

(10) Patent No.: US 7,089,792 B2
(45) Date of Patent: Aug. 15, 2006

(54) MICROMACHINED APPARATUS UTILIZING BOX SUSPENSIONS

(75) Inventor: John A. Geen, Tewksbury, MA (US)

(73) Assignee: Analod Devices, Inc., Norwood, MA (US)

(*) Notice: Subject to any disclaimer, the term of this patent is extended or adjusted under 35 U.S.C. 154(b) by 108 days.

(21) Appl. No.: 10/646,332

(22) Filed: Aug. 22, 2003

(65) Prior Publication Data

US 2005/0056094 A1    Mar. 17, 2005

Related U.S. Application Data

(63) Continuation-in-part of application No. 10/360,987, filed on Feb. 6, 2003, now Pat. No. 6,877,374.

(60) Provisional application No. 60/354,610, filed on Feb. 6, 2002, provisional application No. 60/364,322, filed on Mar. 14, 2002.

(51) Int. Cl.
G01C 19/00    (2006.01)

(52) U.S. Cl. .................. 73/504.14; 73/504.12; 73/514.38

(58) Field of Classification Search ............ 73/504.02, 73/504.04, 504.12, 504.14, 504.15, 514.32, 73/514.16, 514.29, 514.36, 514.37, 514.38, 73/514.23, 514.24
See application file for complete search history.

(56) References Cited

U.S. PATENT DOCUMENTS

| | | | |
|---|---|---|---|
| 2,309,853 A | 2/1943 | Lyman et al. | |
| 4,381,672 A | 5/1983 | O'Connor et al. | ............ 73/505 |
| 4,510,802 A | 4/1985 | Peters | ......................... 73/505 |
| 4,524,619 A | 6/1985 | Staudte | ........................ 73/505 |
| 4,598,585 A | 7/1986 | Boxenhorn | .................. 73/505 |
| 4,654,663 A | 3/1987 | Alsenz et al. | ................. 73/517 |
| 4,744,248 A | 5/1988 | Stewart | ........................ 73/505 |
| 4,744,249 A | 5/1988 | Stewart | ........................ 73/505 |
| 4,884,446 A | 12/1989 | Ljung | ........................... 73/505 |
| 5,016,072 A | 5/1991 | Greiff | ........................... 357/26 |
| 5,016,076 A | 5/1991 | Darwish | ...................... 357/38 |
| 5,025,346 A | 6/1991 | Tang et al. | ................. 361/283 |
| 5,056,366 A | 10/1991 | Fersht et al. | ................. 73/505 |
| 5,111,693 A | 5/1992 | Greiff | .......................... 73/514 |
| 5,144,184 A | 9/1992 | Greiff | ......................... 310/312 |

(Continued)

FOREIGN PATENT DOCUMENTS

WO    WO 93/05401    3/1993

(Continued)

OTHER PUBLICATIONS

Weinberg et al., *A Micromachined Comb-Drive Tuning Fork Rate Gyroscope*, Proceedings of the 49th Annual Meeting of the Institute of Navigation, Jun. 21-23, 1993, 7 pages.

(Continued)

*Primary Examiner*—Helen Kwok
(74) *Attorney, Agent, or Firm*—Bromberg & Sunstein LLP

(57) ABSTRACT

A micromachined gyroscope makes use of Coriolis acceleration to detect and measure rotation rate about a plane normal to the surface of a substrate. Specifically, various resonating structures are suspended within a frame. The resonating structures include phase and anti-phase masses that are mechanically coupled in order to produce a single resonance frequency for the entire resonating system. Rotation of the micromachined gyroscope about the plane produces a rotational force on the frame. The frame is suspended in such a way that its motion is severely restricted in all but the rotational direction. Sensors on all sides of the frame detect the rotational deflection of the frame for measuring the change in direction.

24 Claims, 22 Drawing Sheets

U.S. PATENT DOCUMENTS

| | | | |
|---|---|---|---|
| 5,195,371 A | 3/1993 | Greiff | 73/505 |
| 5,203,208 A | 4/1993 | Bernstein | 73/505 |
| 5,216,490 A | 6/1993 | Greiff et al. | 73/517 |
| 5,241,861 A | 9/1993 | Hulsing, II | 73/505 |
| 5,259,247 A | 11/1993 | Bantien | 73/718 |
| 5,273,939 A | 12/1993 | Becker et al. | 437/209 |
| 5,313,835 A | 5/1994 | Dunn | 73/505 |
| 5,329,815 A | 7/1994 | Dunn et al. | 73/505 |
| 5,341,682 A | 8/1994 | Hulsing, II | 73/505 |
| 5,343,749 A | 9/1994 | Macy | 73/505 |
| 5,349,855 A | 9/1994 | Bernstein et al. | 73/505 |
| 5,359,893 A | 11/1994 | Dunn | 73/505 |
| 5,367,217 A | 11/1994 | Norling | 310/370 |
| 5,377,544 A | 1/1995 | Dunn | 73/505 |
| 5,392,650 A * | 2/1995 | O'Brien et al. | 73/514.18 |
| 5,408,877 A | 4/1995 | Greiff et al. | 73/505 |
| 5,481,914 A | 1/1996 | Ward | 73/504.16 |
| 5,492,596 A | 2/1996 | Cho | 156/632.1 |
| 5,496,436 A | 3/1996 | Bernstein et al. | 156/628.1 |
| 5,505,084 A | 4/1996 | Greiff et al. | 73/504.14 |
| 5,511,419 A | 4/1996 | Dunn | 73/504.08 |
| 5,515,724 A | 5/1996 | Greiff et al. | 73/504.12 |
| 5,530,342 A | 6/1996 | Murphy | 324/158.1 |
| 5,535,902 A | 7/1996 | Greiff | 216/2 |
| 5,537,872 A | 7/1996 | Frere et al. | 73/504.12 |
| 5,555,765 A | 9/1996 | Greiff | 73/504.09 |
| 5,581,035 A | 12/1996 | Greiff | 73/514.32 |
| 5,600,064 A | 2/1997 | Ward | 73/504.04 |
| 5,600,065 A | 2/1997 | Kar et al. | 73/504.12 |
| 5,604,309 A | 2/1997 | Ward | 73/504.02 |
| 5,604,312 A | 2/1997 | Lutz | 73/504.14 |
| 5,608,351 A | 3/1997 | Ward | 330/107 |
| 5,635,638 A | 6/1997 | Geen | 73/504.04 |
| 5,635,639 A | 6/1997 | Greiff et al. | 73/504.04 |
| 5,635,640 A * | 6/1997 | Geen | 73/504.12 |
| 5,646,348 A | 7/1997 | Greiff et al. | 73/514.36 |
| 5,650,568 A | 7/1997 | Greiff et al. | 73/504.09 |
| 5,672,949 A | 9/1997 | Ward | 318/609 |
| 5,696,323 A | 12/1997 | Hulsing, II | 73/504.12 |
| 5,717,140 A | 2/1998 | Hulsing, II | 73/504.16 |
| 5,734,105 A | 3/1998 | Mizukoshi | 73/504.02 |
| 5,747,961 A | 5/1998 | Ward et al. | 318/646 |
| 5,763,781 A | 6/1998 | Netzer | 73/504.16 |
| 5,767,405 A | 6/1998 | Bernstein et al. | 73/504.16 |
| 5,783,973 A | 7/1998 | Weinberg et al. | 331/35 |
| 5,795,988 A | 8/1998 | Lo et al. | 73/1.77 |
| 5,796,001 A | 8/1998 | Greiff et al. | 73/504.16 |
| 5,869,760 A | 2/1999 | Geen | 73/504.12 |
| 5,886,816 A | 3/1999 | Faris | 359/464 |
| 5,892,153 A | 4/1999 | Weinberg et al. | 73/504.16 |
| 5,895,850 A | 4/1999 | Buestgens | 73/504.12 |
| 5,895,851 A | 4/1999 | Kano et al. | 73/504.04 |
| 5,911,156 A | 6/1999 | Ward et al. | 73/504.16 |
| 5,918,280 A | 6/1999 | Gang et al. | 73/504.12 |
| 5,920,012 A | 7/1999 | Pinson | 73/504.12 |
| 5,945,600 A | 8/1999 | Touge et al. | 73/504.14 |
| 5,952,572 A | 9/1999 | Yamashita et al. | 73/504.04 |
| 5,955,668 A | 9/1999 | Hsu et al. | 73/504.12 |
| 5,987,986 A | 11/1999 | Wyse et al. | 73/504.12 |
| 5,992,233 A | 11/1999 | Clark | 73/514.35 |
| 6,009,751 A | 1/2000 | Ljung | 73/504.02 |
| 6,032,531 A | 3/2000 | Roszhart | 73/504.04 |
| 6,044,707 A | 4/2000 | Kato | 73/504.14 |
| 6,064,169 A | 5/2000 | Ward et al. | 318/646 |
| 6,067,858 A | 5/2000 | Clark et al. | 73/504.16 |
| 6,070,463 A | 6/2000 | Moriya et al. | 73/504.12 |
| 6,089,089 A | 7/2000 | Hsu | 73/504.12 |
| 6,122,961 A | 9/2000 | Geen et al. | 73/504.12 |
| 6,128,953 A | 10/2000 | Mizukoshi | 73/504.02 |
| 6,155,115 A | 12/2000 | Ljung | 73/504.12 |
| 6,164,134 A | 12/2000 | Cargille | 73/504.02 |
| 6,189,381 B1 | 2/2001 | Huang et al. | 73/504.12 |
| 6,190,571 B1 | 2/2001 | Kato | 216/2 |
| 6,230,563 B1 | 5/2001 | Clark et al. | 73/504.04 |
| 6,250,156 B1 | 6/2001 | Seshia et al. | 73/502.12 |
| 6,250,157 B1 | 6/2001 | Touge | 73/504.12 |
| 6,257,059 B1 | 7/2001 | Weinberg et al. | 73/504.16 |
| 6,282,960 B1 | 9/2001 | Samuels et al. | 73/514.32 |
| 6,289,733 B1 | 9/2001 | Challoner et al. | 73/504.12 |
| 6,311,555 B1 | 11/2001 | McCall et al. | 73/488 |
| 6,321,598 B1 | 11/2001 | Iwaki et al. | 73/504.02 |
| 6,505,511 B1 | 1/2003 | Geen et al. | 73/504.12 |
| 6,516,666 B1 | 2/2003 | Li | 73/504.12 |
| 6,561,029 B1 | 5/2003 | Folkmer et al. | 73/504.14 |
| 6,767,758 B1 | 7/2004 | Geen | 438/48 |
| 6,860,151 B1 | 3/2005 | Flatt et al. | 73/504.16 |
| 2003/0005767 A1 | 1/2003 | Hulsing, II | 73/514.02 |
| 2003/0131664 A1 | 7/2003 | Mochida et al. | 73/504.12 |
| 2003/0131669 A1 | 7/2003 | Osawa | 73/861.355 |

FOREIGN PATENT DOCUMENTS

| | | |
|---|---|---|
| WO | WO 96/39615 | 12/1996 |
| WO | WO 01/79862 A1 | 10/2001 |

OTHER PUBLICATIONS

Seshia et al., *Integrated Microelectromechanical Resonant Output Gyroscope*, updated, online <http://hera.berkeley.edu/IRO/Summary/o 1 abstracts/ aseshia.1.html>, printed Feb. 6, 2002, 2 pages.

Geen et al., *Single-Chip Surface Micromachined Integrated Gyroscope with 50 °/h Allan Deviation*, IEEE Journal of Solid-State Circuits, vol. 37, No. 12, Dec. 2002, 7 pages.

Authorized Officer Mildred Condron, *International Search Report and The Written Opinion of the International Searching Authority*, International Searching Authority, Dec. 22, 2004, 13 pages.

* cited by examiner

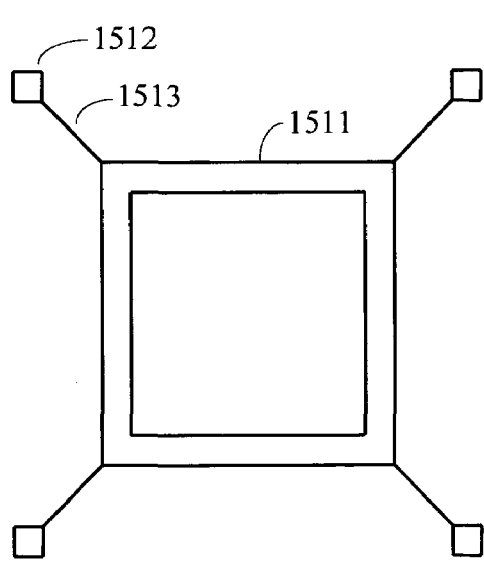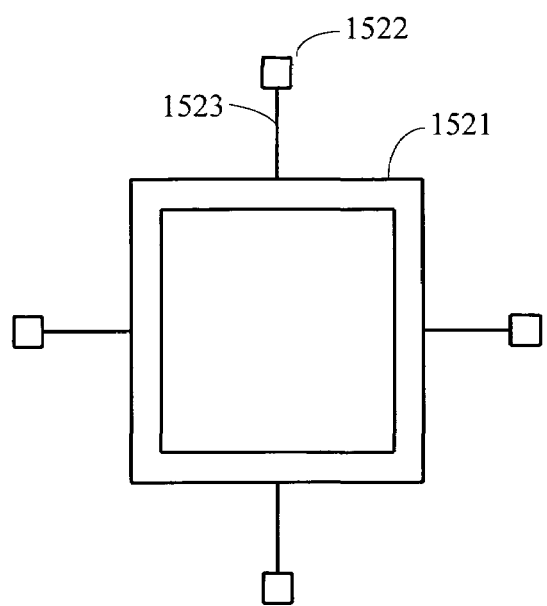
*FIG. 15A*  *FIG. 15B*

MICROMACHINED APPARATUS UTILIZING BOX SUSPENSIONS

PRIORITY

This application is a continuation-in-part of U.S. patent application Ser. No. 10/360,987 entitled Micromachined Gyroscope, which was filed on Feb. 6, 2003 now U.S. Pat. No. 6,877,374 in the name of John A. Geen and claimed the benefit of U.S. Provisional Patent Application No. 60/354,610, which was filed on Feb. 6, 2002, and of U.S. Provisional Patent Application No. 60/364,322, which was filed on Mar. 14, 2002, all of which are hereby incorporated herein by reference in their entireties.

FIELD OF THE INVENTION

The present invention relates generally to micromachined gyroscopes, and more particularly to micromachined gyroscopes that use Coriolis acceleration to detect rotational movement.

BACKGROUND

Gyroscopes are used to measure the rate at which objects rotate. The information provided by gyroscopes can be used in many applications. For example, the information provided by gyroscopes can be used to trigger automobile airbags during rollover, improve the accuracy and reliability of GPS/navigation systems, and stabilize moving platforms such as automobiles, airplanes, robots, antennas, and industrial equipment.

A surface micromachined gyroscope typically includes various planar structures suspended with anchors and flexures over and parallel to an underlying substrate. Vibratory structures are typically dithered substantially along a dither axis in a plane parallel to the substrate and perpendicular to a sensitive axis that can be in the plane of the body or perpendicular to the planar structures and to the substrate. As is generally known, rotation of the gyroscope about the sensitive axis causes the planar structures move along a Coriolis axis, which is mutually orthogonal to the dither axis and the sensitive axis. This motion can be sensed to derive a signal that indicates the angular velocity of the rotation.

SUMMARY OF THE INVENTION

In accordance with one aspect of the invention, a micromachined apparatus (such as a micromachined gyroscope) includes a frame having a substantially rectangular perimeter, a plurality of elongated stress relief members arranged substantially in a rectangular pattern outside of the frame perimeter, and a plurality of box suspensions coupling the corners of the frame to the plurality of stress relief members. Each stress relief member has at least one substrate anchor substantially at its intersection with a line through the midpoints of a pair of opposite frame sides. Each box suspension includes a substantially rectangular array of box flexures, where the box flexures at a first corner of the array are coupled to the frame, the box flexures at a second corner opposite the first corner are coupled respectively to the ends of a pair of stress relief members but not to one another. The box suspension also includes a diagonal brace coupled between third and fourth corners of the array. The box flexures at the second corner are also coupled respectively at a pivot point to a plurality of support flexures. The plurality of support flexures have a substrate anchor substantially at an intersection with a line through the first and second corners.

In a typical embodiment, the frame has a substantially square perimeter and the plurality of elongated stress relief members are arranged substantially in a square pattern outside of the frame perimeter. Also in a typical embodiment, the rectangular array is substantially square. However, the rectangular array need not be square, although typically the ratios of the sides of the rectangular array are substantially the same as those of the rectangular perimeter and rectangular pattern such that a straight line from the intersection point of the lines through the midpoints of each pair of opposite frame sides through its corner also passes through diagonally opposite corners of the rectangular array.

The plurality of stress relief members typically consist of four stress relief members, each extending substantially between two pivot points, although there can be more than four members (e.g., by splitting each in half and anchoring each near the center line. The stress relief members may be anchored using multiple anchors or a single elongated anchor. The box flexures are typically designed to align substantially with a rectilinear grid for etching the box flexures. Preferably, the diagonal brace substantially restricts motion of the frame other than rotation of the frame about the intersection point of the lines through the midpoints of each pair of opposite frame sides. The frame typically includes finger structures that extend outward toward the stress relief members, and there are typically also a plurality of sensing fingers positioned between the frame fingers within the space between the frame and the stress relief members. In a typical embodiment, the frame, stress relief members, and box suspensions are micromachined from a common piece of material.

In accordance with another aspect of the invention, an apparatus includes a substantially rectangular array of box flexures, where the box flexures at a first corner of the array are coupled to the frame, the box flexures at a second corner opposite the first corner are coupled respectively to the ends of a pair of stress relief members but not to one another. The box suspension also includes a diagonal brace coupled between third and fourth corners of the array. The box flexures at the second corner are also coupled respectively at a pivot point to a plurality of support flexures. The plurality of support flexures have a substrate anchor substantially at an intersection with a line through the first and second corners.

In a typical embodiment, the rectangular array is substantially square. The box flexures are typically designed to align substantially with a rectilinear grid for etching the box flexures. Preferably, the diagonal brace substantially restricts motion of the frame other than rotation of the frame about the intersection point of the lines through the midpoints of each pair of opposite frame sides.

In accordance with another embodiment of the invention, a method for reducing stresses in a micromachined apparatus involves forming a plurality of micromachined structures from a common material. The micromachined structures include a frame suspended from a plurality of stress relief members by a plurality of box suspensions. Each box suspension includes a substantially rectangular array of box flexures, where the box flexures at a first corner of the array are coupled to the frame, and the box flexures at a second corner opposite the first corner are coupled respectively to the ends of a pair of stress relief members but not to one another. The box suspension also includes a diagonal brace coupled between third and fourth corners of the array. The box flexures at the second corner are coupled respectively about a pivot point to a plurality of support flexures. The method also involves anchoring each of the plurality of stress relief members to a substrate substantially at an intersection of the stress relief member with a line through the centers of opposite sides of the frame. The method also involves anchoring the support flexures of each of the plurality of box suspensions to the substrate using a single anchor substantially at an intersection with a line through opposite corners of the frame.

In a typical embodiment, the rectangular array is substantially square. The box flexures are typically designed to align substantially with a rectilinear grid for etching the box flexures. Preferably, the diagonal brace substantially restricts motion of the frame other than rotation of the frame about the intersection point of the lines through the midpoints of each pair of opposite frame sides.

In accordance with another aspect of the invention, a micromachined apparatus includes a substrate, a frame supporting a number of resonating structures, suspension means for suspending the frame over and parallel to the substrate so as to substantially restrict movement of the frame relative to the substrate to only rotational movement about an axis normal to the substrate, and means for reducing stresses in the suspension means.

BRIEF DESCRIPTION OF THE DRAWINGS

In the accompanying drawings:

FIG. 15A is a schematic diagram showing an exemplary corner-suspended frame using radial spoke suspensions;

FIG. 15B is a schematic diagram showing an exemplary side-suspended frame using radial spoke suspensions;

DETAILED DESCRIPTION OF A PREFERRED EMBODIMENT

Figure 1:
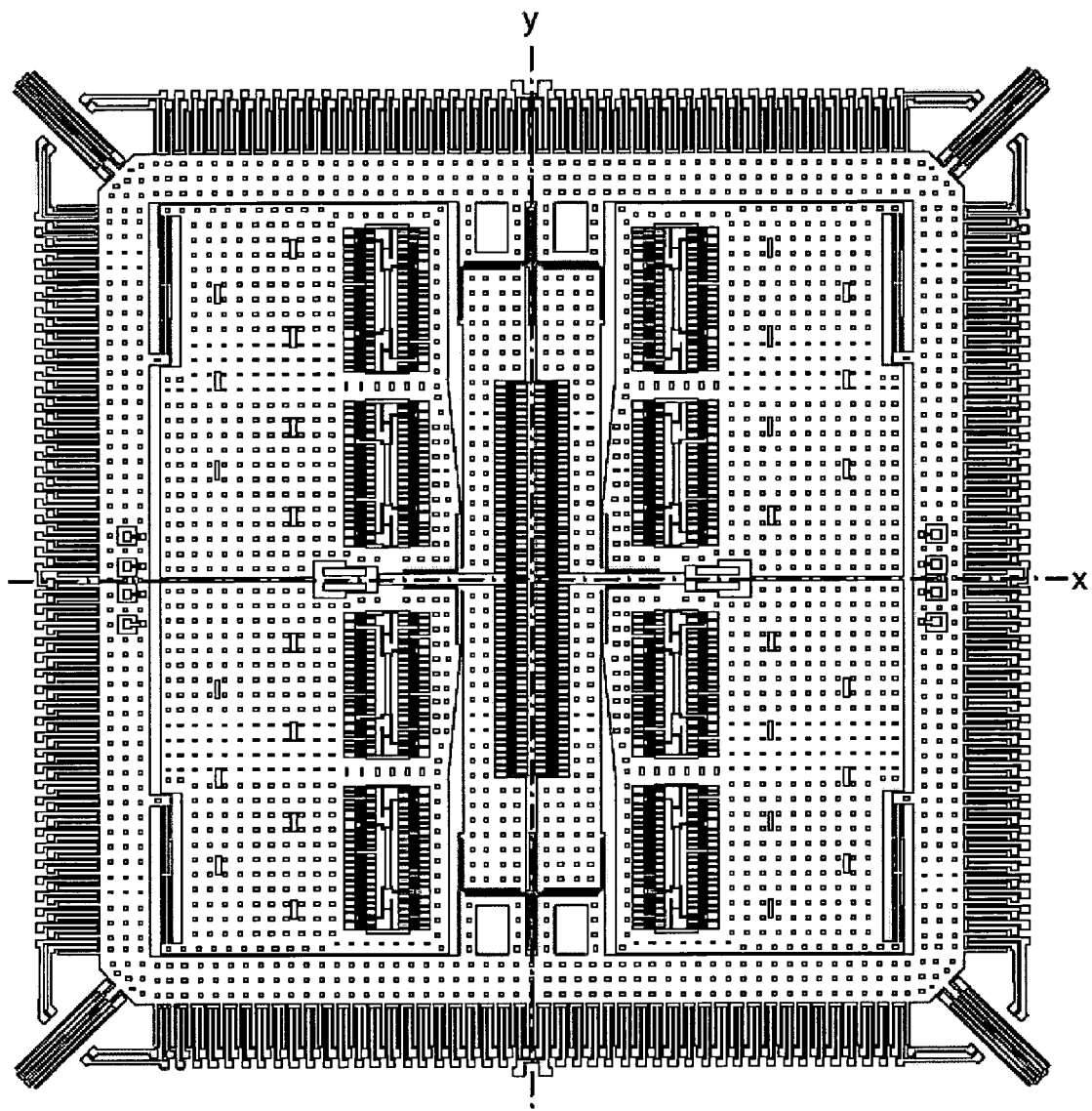
FIG. 1 shows an exemplary micromachined gyroscope structure in accordance with an embodiment of the present invention.

In embodiments of the present invention, a micromachined gyroscope includes various resonating structures that are suspended within a frame. The frame and the resonating structures are typically planar and are suspended with anchors and flexures over and parallel to an underlying substrate. The frame is suspended in such a way that its motion is severely restricted in all but the rotational direction about an axis normal to the plane of the substrate substantially through the center of mass of the frame. Rotation of the apparatus about that axis produces a rotational force on the frame through the effects of Coriolis acceleration. This Coriolis acceleration is detected and measured, preferably using sensors along all sides of the frame. The resonating structures are preferably designed so as to reduce extraneous forces on the frame (such as translational and rotational forces caused by unbalanced motion of the resonating structures) that can be misread as Coriolis accelerations.

In a typical embodiment of the present invention, the frame, the resonating structures, the frame suspensions, and other flexures are micromachined from a common material (wafer) using a photolithography process that includes masking and etching operations. The masks used to define the etching based upon a rectilinear grid. Generally speaking, it is preferably for micromachined features to be aligned with the grid rather than set at an angle to the grid.

In embodiments of the present invention, the suspensions for the frame ideally permit rotation of the frame about the center of mass within the plane of the frame, but are strongly resistant to translation in any axis. Translational compliance in the plane of the frame permits both quadrature interference from to flexure imbalance and sensitivity to linear acceleration. Translational compliance out of plane reduces the resistance to z-axis shock (i.e., normal to the plane of the frame), permits quadrature from sidewall angle mismatch, and increases cross-coupling via flexure of the frame. The suspension should also accommodate the intrinsic stress of the micromachined material and stress from external accelerations without significant stress stiffening.

Illustrative embodiments meet the in-plane constraints by suspending the frame from simple radial "spokes" placed at the corners of the frame or at the middle of the four sides of the frame. FIG. 15A schematically shows an exemplary corner-suspended gyroscope 1510 having a substantially square frame 1511 suspended at its four corners by substantially identical suspensions having a flexure 1513 connected at one end to the frame 1511 and connected at the other end to a substrate via an anchor 1512. FIG. 15B schematically shows an exemplary side-suspended gyroscope 1520 having a substantially square frame 1521 suspended on its four sides by substantially identical suspensions having a flexure 1523 connected at one end to the frame 1521 and connected at the other end to a substrate via an anchor 1522. The spoke suspensions permit rotation of the frame without significant in-plane translation.

In preferred embodiments of the present invention, the frame is suspended from its corners rather than from its sides. This is because corner suspensions tend to result in higher frequency out-of-plane normal modes for the frame compared to side suspensions. Among other things, this tends to keep the operational frequency of the frame clear of other normal modes in order to avoid coupling errors in the gyroscope.

For spoke-type suspensions, out-of-plane translation is substantially defined by the aspect ratio of the spoke cross-section. Specifically, the ratio of stiffness in and out of plane varies as the square of the ratio of cross sectional widths in those directions. Therefore, it is desirable to make the flexures narrower in-plane than their thickness out-of-plane. In practice, however, the suspension flexures typically have slightly different widths due to variances in the micromachining process. This uncertainty in micromachining is exacerbated when the features depart from a rectilinear grid used for etching the flexures, as is the case for diagonally oriented corner flexures. This is because the etching of such diagonally oriented corner flexures using a rectilinear grid typically results in flexures that have jagged edges. Furthermore, the resulting flexure may be narrower or wider than planned due to approximations used to etch diagonal features.

Figure 16:
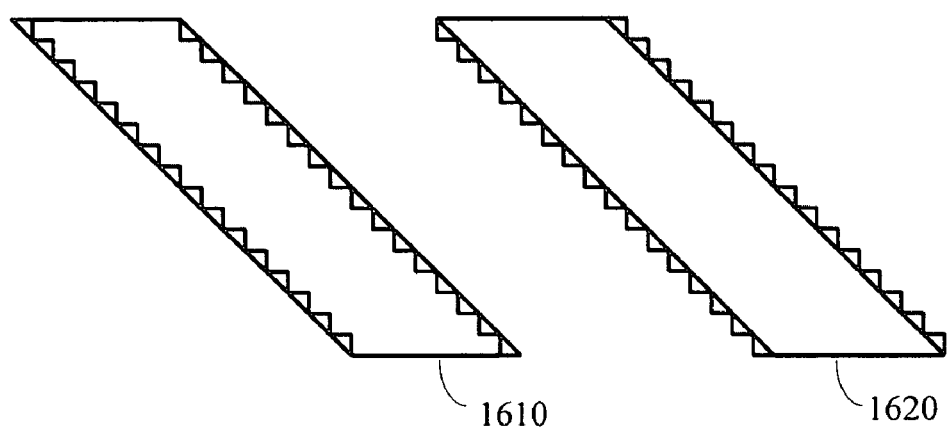
FIG. 16 demonstrates width variations due to approximations for micromachined structures that are orientied diagonally to the rectilinear grid.

Moreover, the stiffness of the flexures varies as the cube of their width so that small errors in width have an exaggerated effect on stiffness. If the stiffness of the flexures are not identical, then the center of suspension of the rotating frame will not correspond to its center of inertia and, instead of rotating smoothly, it will also have a translational tendency (i.e., it will "wobble"). This tends to couple the driven mode of vibration directly into the sensing motion and produces a large interfering signal. In practice, it is desirable to keep such interference below ten or so parts per million of the driven vibration. The interference is, even at so small a level, comparable with the maximum Coriolis signal. In a typical embodiment of the invention, the width of the flexures is around two microns, so the width accuracy requirement is a very difficult practical constraint. The mask making process involves translating the working drawings onto a rectilinear grid. If the flexures are not aligned with the grid their outline is made to conform to a near approximation on the grid. There will generally be several different acceptable approximations to any given angle and the algorithms for generating them are complex. The result is that there is no easy way of ensuring that two flexures on the same structure have identical widths if they are misaligned with respect to the grid. FIG. 16 demonstrates width variations due to such approximations for micromachined structures that are oriented diagonally to the rectilinear grid. Both approximations have alternate grid points on the desired sloping lines and they have the same average deviation from those lines, but structure 1620 results in greater effective width than structure 1610.

Another issue with simple, external spokes is their lack of stress relief. It is possible to make structural silicon films for micromachining which are both very flat and have very low residual stress, but these typically have sporadic excessive grain growth which makes them unsuitable for production. Consequently, a compromise is reached in which the grain growth is well controlled but the film has a somewhat higher residual stress, which becomes concentrated in the support flexures attached to the substrate anchors. The effect of this stress is to stiffen the flexures, raising the resonant frequency of the system. In practice, this stress makes the stiffness of such spokes about ten times greater than it would be otherwise.

Figures 17A, 17B, 17C, 17D:
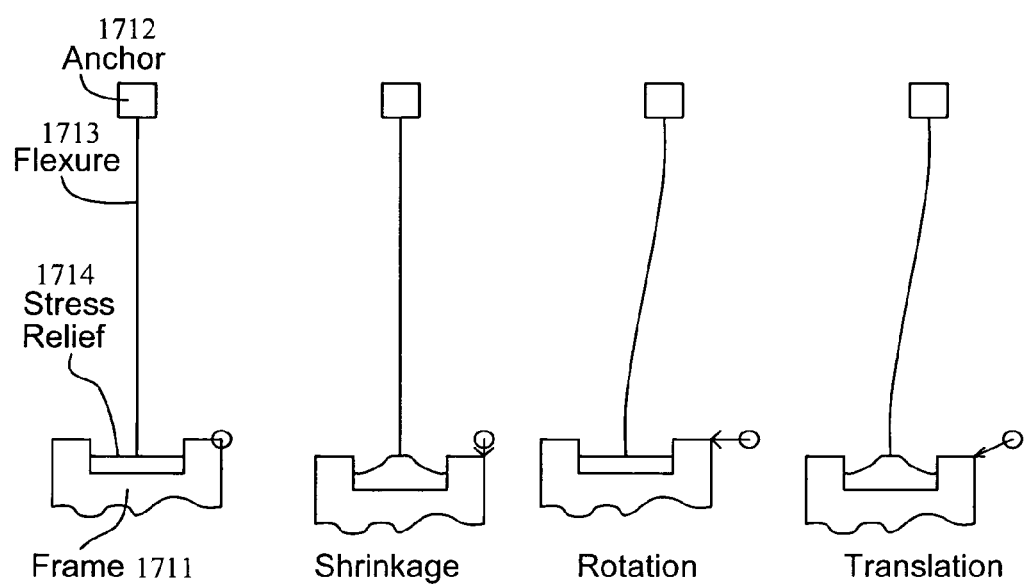
FIGS. 17A–D shows a modified spoke suspension in which a flexure is connected at one end to the substrate via an anchor and connected at the other end to a stress relief flexure which in turn is connected to a frame.

The simple spoke suspensions can be modified to reduce tensile stresses. FIG. 17A shows a modified spoke suspension 1710 in which the flexure 1713 is connected at one end to the substrate via anchor 1712 and connected at the other end to a stress relief flexure 1714 which in turn is connected to the frame 1711. Unfortunately, the spoke suspension 1710 tends to sacrifice translational stiffness in order to achieve the relief, thereby sacrificing the null stability of the gyro. FIG. 17B shows the effect of shrinkage on the spoke suspension 1710, where the decrease in length of the flexure 1713 is reflected in a corresponding bending of the stress relief flexure 1714. FIG. 17C shows the effect of rotation on the spoke suspension 1710, where rotation of the frame 1711 is reflected in a corresponding bending of the flexure 1713. FIG. 17D shows the effect of translation on the spoke suspension 1710, where translation of the frame 1711 is reflected in a corresponding bending of both the flexure 1713 and stress relief flexure 1714.

In exemplary embodiments of the present invention, a box suspension is used to suspend the gyroscope frame at each of its corners. The box suspension includes a substantially rectangular (and typically square) array of box flexures. These box flexures, which to a large degree determine the stiffness of the box suspension, are substantially aligned with the rectilinear grid of the micromachining masks, as fixed by other critical features in the gyroscope resonator such as the fingers and dither flexures. The residual stress in the micromachining structural layer is relieved more effectively in the box suspension compared to a spoke suspension (by a factor of 1500 in an exemplary embodiment), and the desired rotational motion is facilitated while the undesirable in-plane translations are substantially inhibited by the box suspension.

The box suspension relieves stress by decomposition into orthogonal components which can be returned to anchors on the center lines of the gyroscope. The return is by way of stress relief members micromachined from the same sheet of material as the remainder of the gyroscope structure. The shrinkage of the stress relief members returning to the anchors substantially matches that of the gyroscope frame and relieves stress along the axis of each stress relief member, that is, perpendicular to the center line with its anchor. The mechanism for achieving this decomposition is preferably a braced box with an open corner. The flexural members defining its compliance are substantially aligned with the rectilinear mask grid, and the width of the diagonal brace is not critical. The box is compliant tangentially, that is parallel to the axis of the brace, but stiff to motions parallel to the box sides. The elongated members returning to the neutral axes are compliant out-of-plane, so additional, short anchored flexures are typically used to restrain their ends in two axes while allowing the shrinkage which relieves the stress. It should be noted that, although the box suspension is preferably substantially square, the box suspension need not be square, although the ratios of the sides of the box should be substantially the same as those of the structure such that a straight line from the center of the structure through its corner also passes through diagonally opposite corners of the box.

Figure 18:
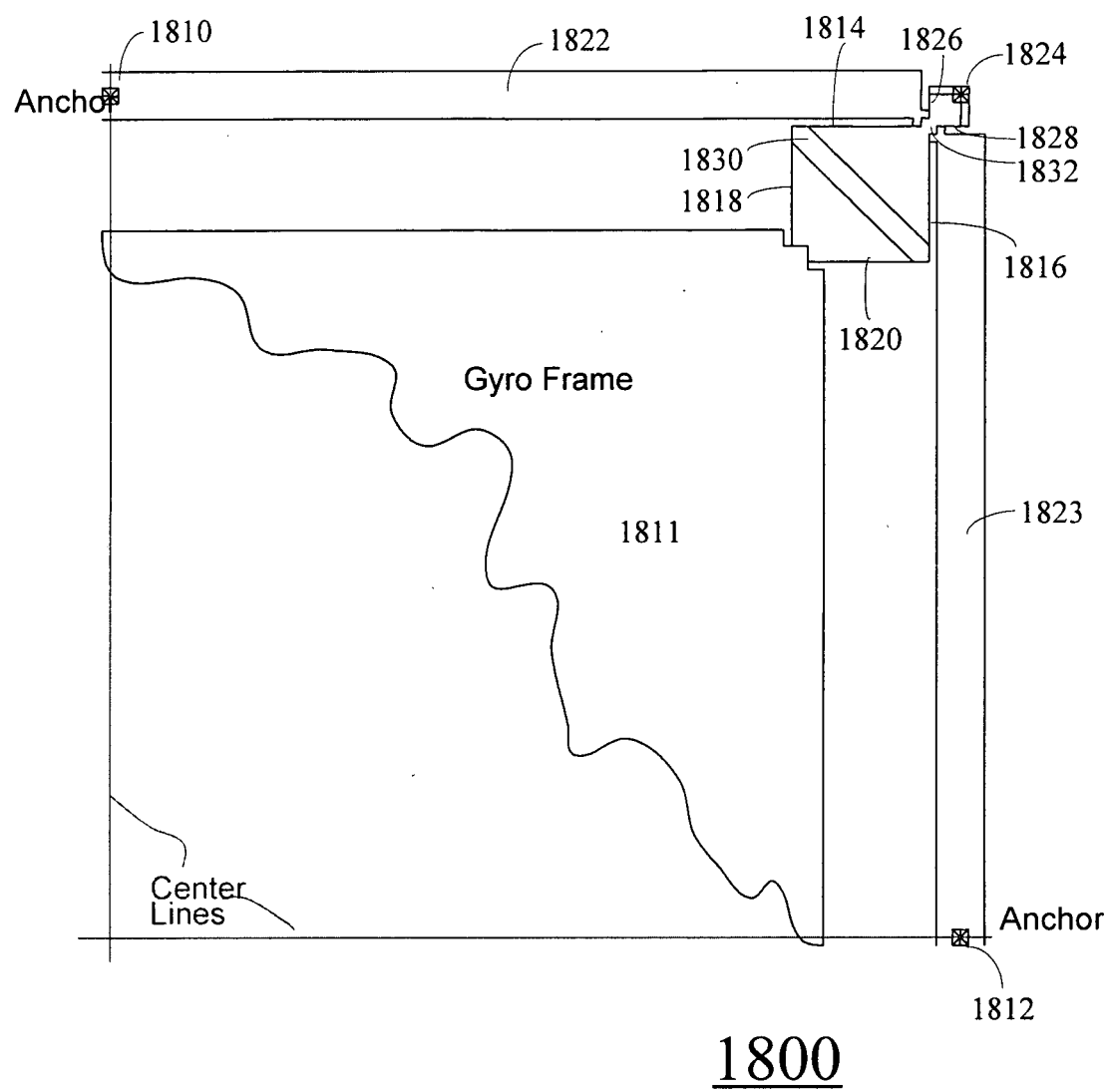
FIG. 18 shows an exemplary box suspension for a corner-suspended frame in accordance with an embodiment of the present invention.

FIG. 18 shows an exemplary box suspension 1800 in accordance with an embodiment of the present invention. The box suspension 1800 includes box flexures (1814, 1816, 1818, and 1820) in a rectangular array and a wider diagonal brace 1830. Flexures at diagonally opposite corners of the array are attached to the frame 1811 (i.e., flexures 1818 and 1820 are attached to the frame 1811) and to the ends of the stress relief members (i.e., flexures 1814 and 1816 are attached to the ends of stress relief members 1822 and 1823, respectively). The other ends of the stress relief members 1822 and 1823 are anchored on the center lines of the structure by anchors 1810 and 1812, respectively. The flexures 1814 and 1816 are not joined to each other where they attach to the stress relief members 1822 and 1823. The point in space at the intersection of the axes of flexures 1814 and 1816 forms a pivot point 1832. When the structural material shrinks, the corner of the array (1814, 1816, 1818, 1820) and brace 1830 have a tendency to move toward the center of the structure, that is the intersection of the center lines. A good stress relief will not inhibit that motion. The motion can be considered to comprise two components, each towards a center line. The motion towards the center line with anchor 1810 is emulated by the longitudinal shrinkage of member 1822 and flexure 1814 as they are made of the same material, so there is no differential tendency and that component is not inhibited. The other component is not inhibited by flexure 1814 because it is in the direction of low stiffness for that flexure. Similarly, the other member 1823 and flexure 1816 do not inhibit the motions because they match the component toward anchor 1812 and 1816 is compliant to the other.

On the other hand, any relative motion of the frame 1811 and the ends of the stress relief members 1822 and 1823 either parallel to the center lines or radial from the center is severely restricted by the brace 1830. The ends of the members 1822 and 1823 are susceptible to bending away from their preferred positions especially as the width of the members is kept small to save the cost of die area. Support flexures 1826 and 1828 are provided to prevent this. They are short and stiff to bending out of plane and do not allow motion along their longitudinal axes, but are sufficiently compliant along the axes of the members 1822 and 1823 to allow substantially uninhibited shrinkage. Their anchor 1824 is at the intersection of the members axes so as to prevent differential shrinkage stress along the axes of the support flexures. The member anchors 1810 and 1812 are preferably doubled or elongated in-plane to enhance their torsional stiffness and prevent the members from twisting about them.

The box suspensions permit rotation of the frame 1811 about its center. That is, it allows motion tangential to a radius drawn from the center to the corner of the structure. The required motion is, in practice, only of the order of a hundred microradians. This compliance is easily appreciated by considering the box to rotate slightly about the pivot point. The geometry is such that the motion does not require any of the components of the box to change length, but rather only to bend slightly.

Figure 19:
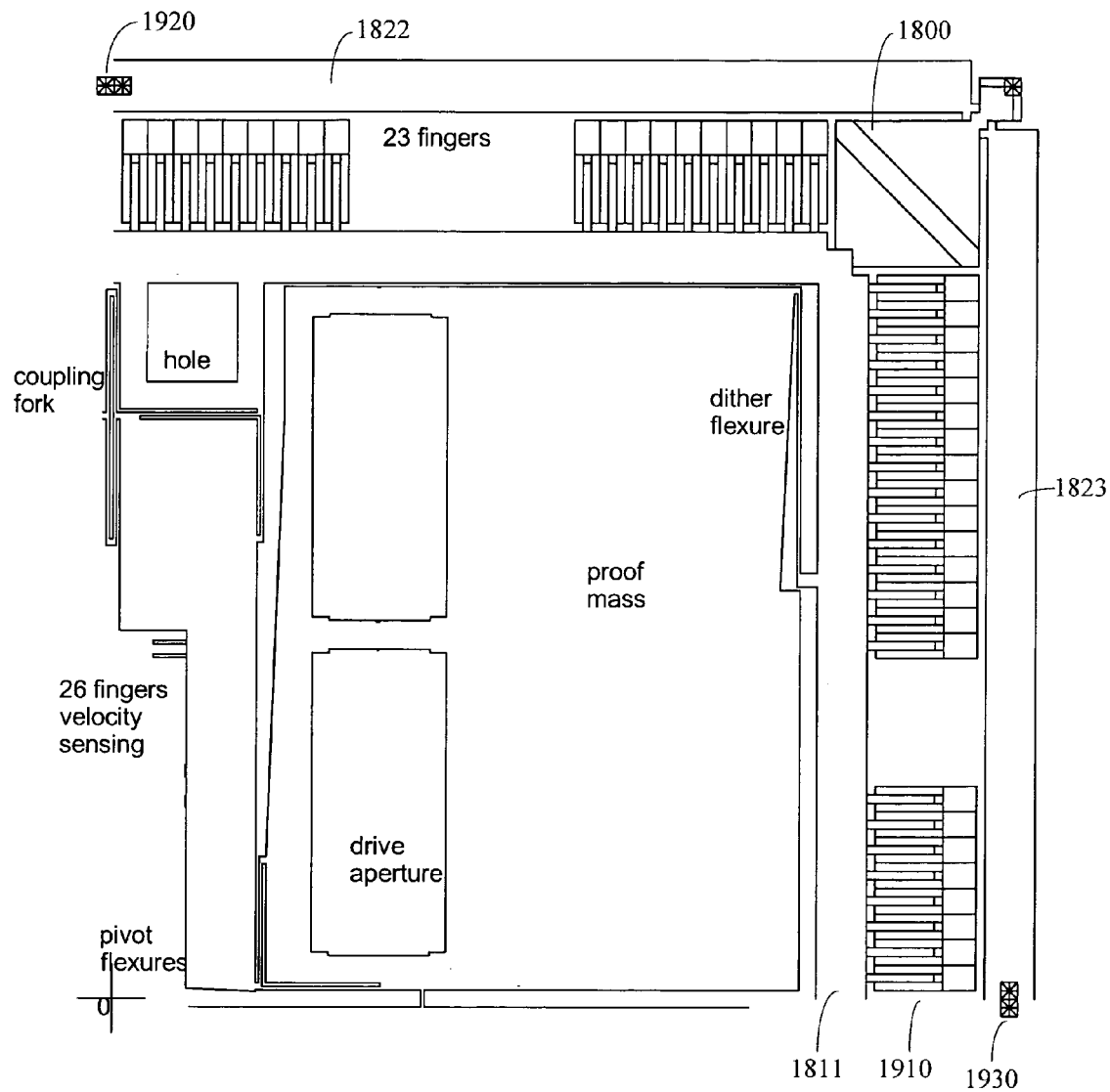
FIG. 19 shows a quarter model of an exemplary micromachined gyroscope including a box suspension in accordance with an embodiment of the present invention.
Figure 21:
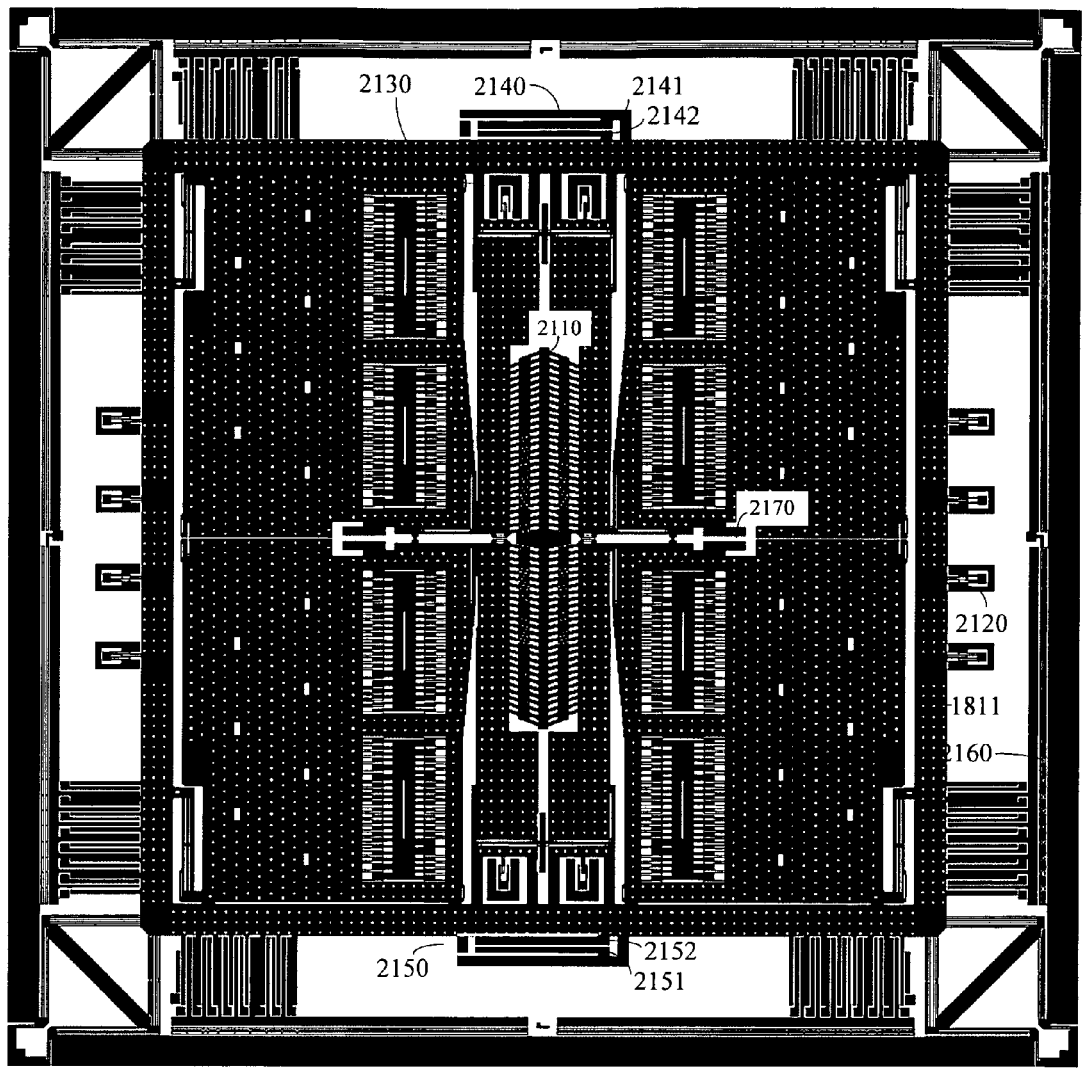
FIG. 21 shows an exemplary embodiment of the present invention including box corner suspensions in accordance with an embodiment of the present invention.

FIG. 19 shows a quarter model of an exemplary micromachined gyroscope including a box suspension in accordance with an embodiment of the present invention. The box suspension 1800 suspends the frame 1811 from the stress relief members 1822 and 1823, as discussed above. Finger structures 1910 are positioned between the frame 1811 and the stress relief members 1822 and 1823. Specifically, the frame 1811 includes fingers that extend outward toward the stress relief members, and sensing fingers anchored to the substrate are interleaved with the fingers of the frame 1811. Each of the stress relief members 1822 and 1823 is anchored to the substrate using double anchors 1920 and 1930, respectively. It should be noted that a substantially identical box suspension 1800 is positioned symmetrically at each of the four corners of the frame, as shown in FIG. 21.

The resonating structures suspended within the frame 1811 are preferably designed so as to reduce extraneous forces on the frame 1811 (such as translational and rotational forces caused by unbalanced motion of the resonating structures) that can be misread as Coriolis accelerations. The present invention is not limited to any particular resonating structures. Embodiments of the present invention can include one or more of the resonating structures described below.

FIG. 1 shows an exemplary micromachined gyroscope structure 100 in accordance with an embodiment of the present invention. Micromachined gyroscope structure 100 is typically one of many micromachined from a single silicon wafer. The micromachined gyroscope structure 100 is typically mounted to a substrate. The micromachined gyroscope structure 100 is substantially symmetrical top-to-bottom along the x axis as well as side-to-side along the y axis.

Figure 2:
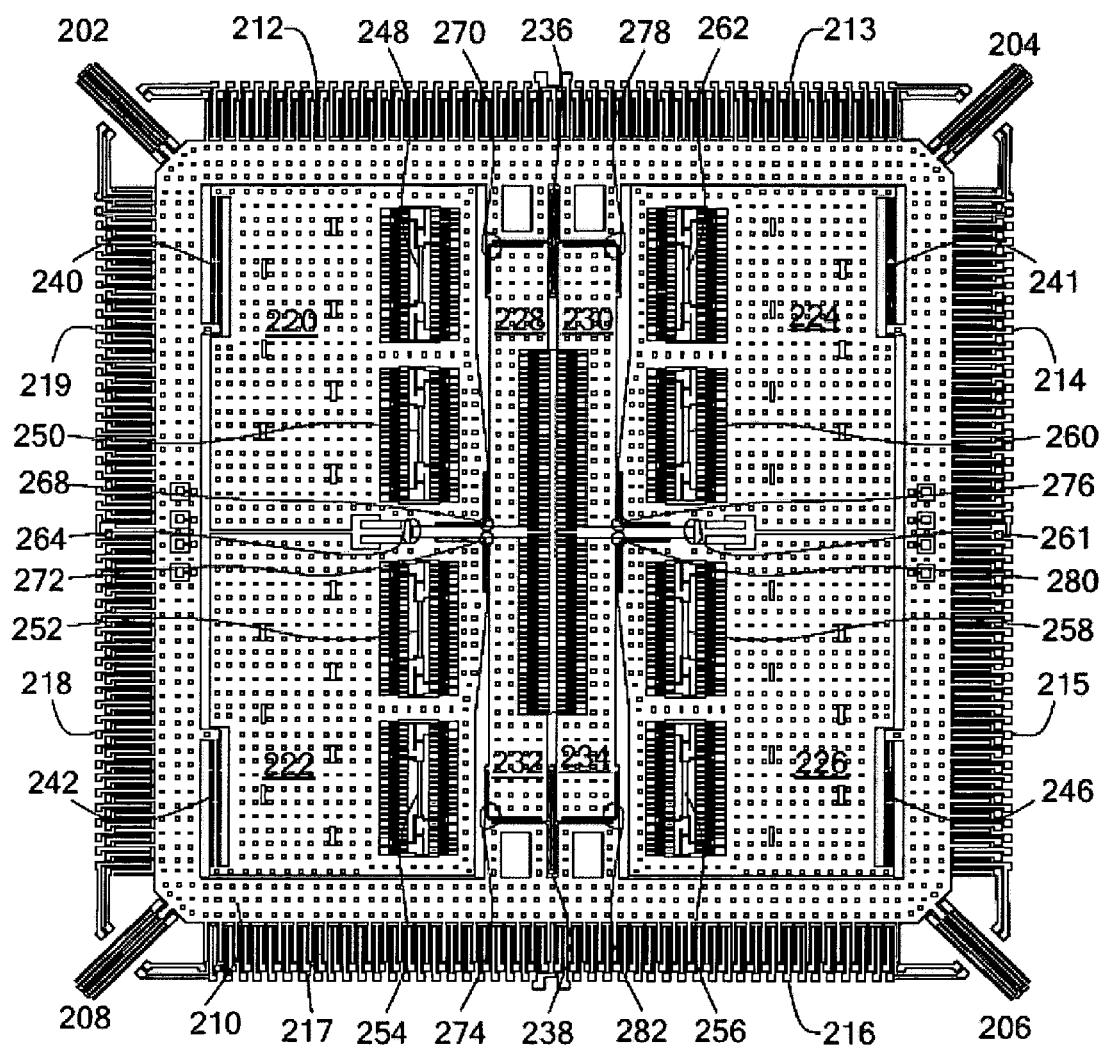
FIG. 2 identifies various components of the micromachined gyroscope structure in accordance with an embodiment of the present invention.
Figure 3:
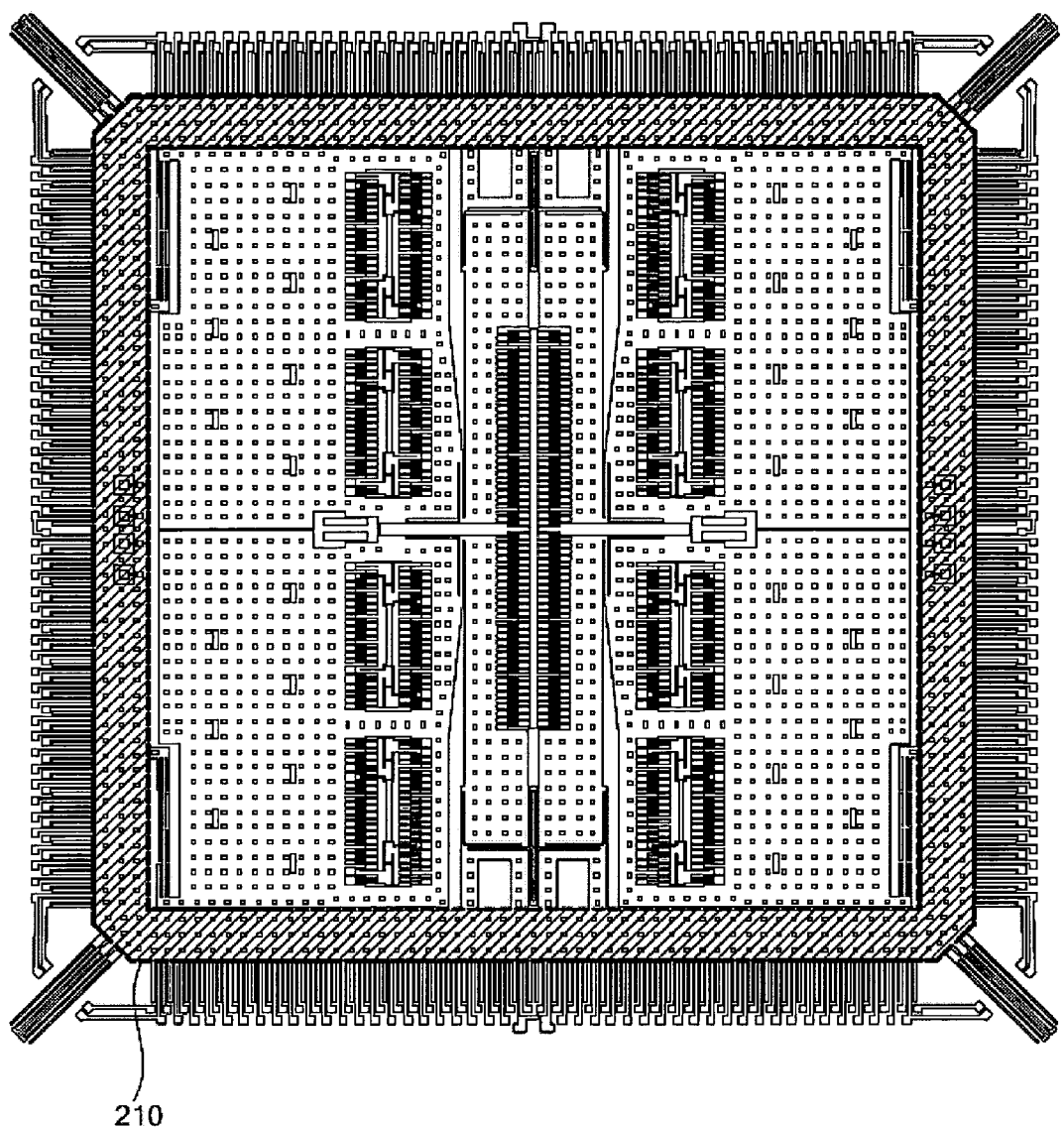
FIG. 3 shows a highlighted view of the frame of the micromachined gyroscope structure in accordance with an embodiment of the present invention.
Figure 4:
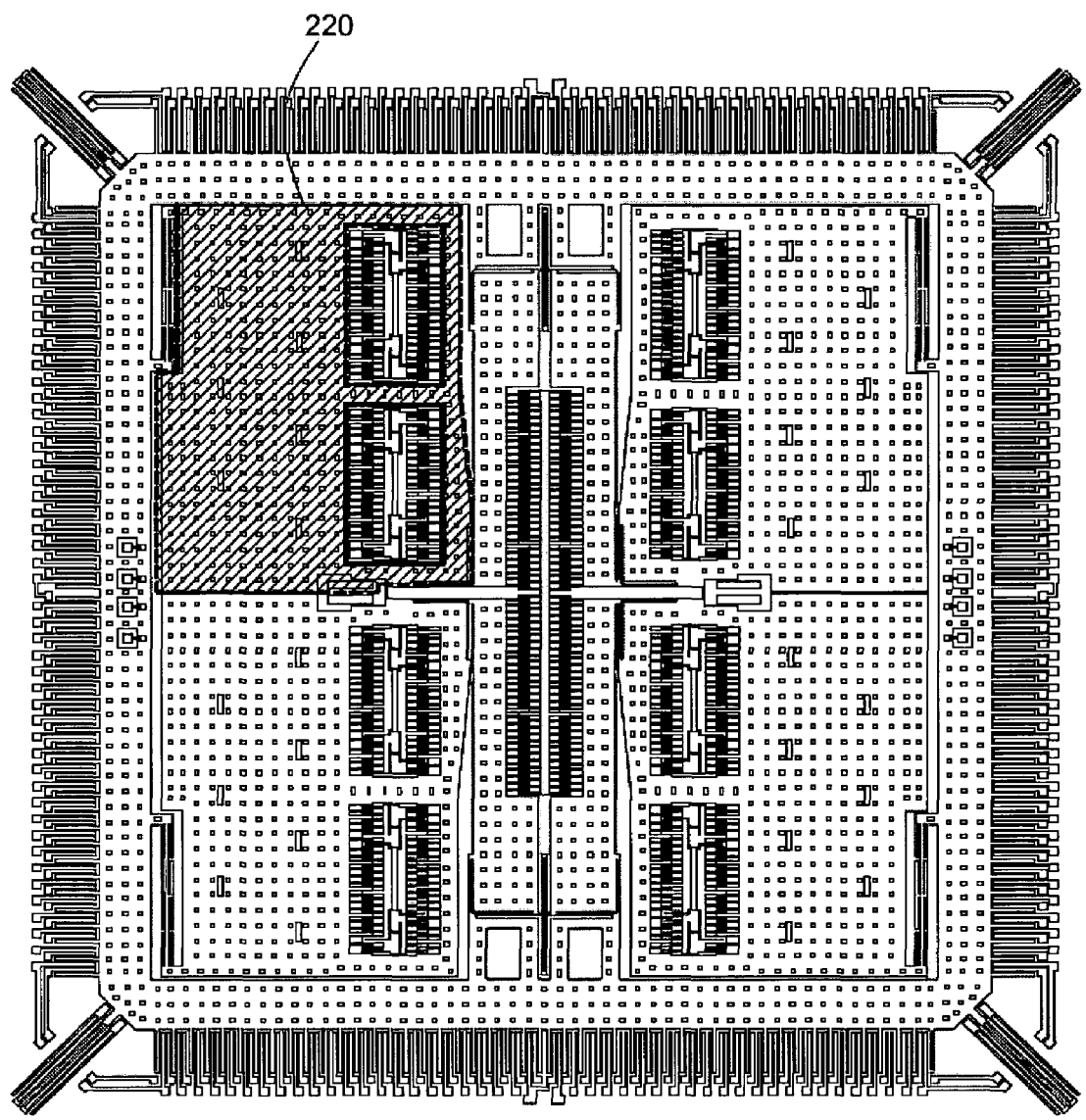
FIG. 4 shows a highlighted view of a movable mass of the micromachined gyroscope structure in accordance with an embodiment of the present invention.
Figure 5:
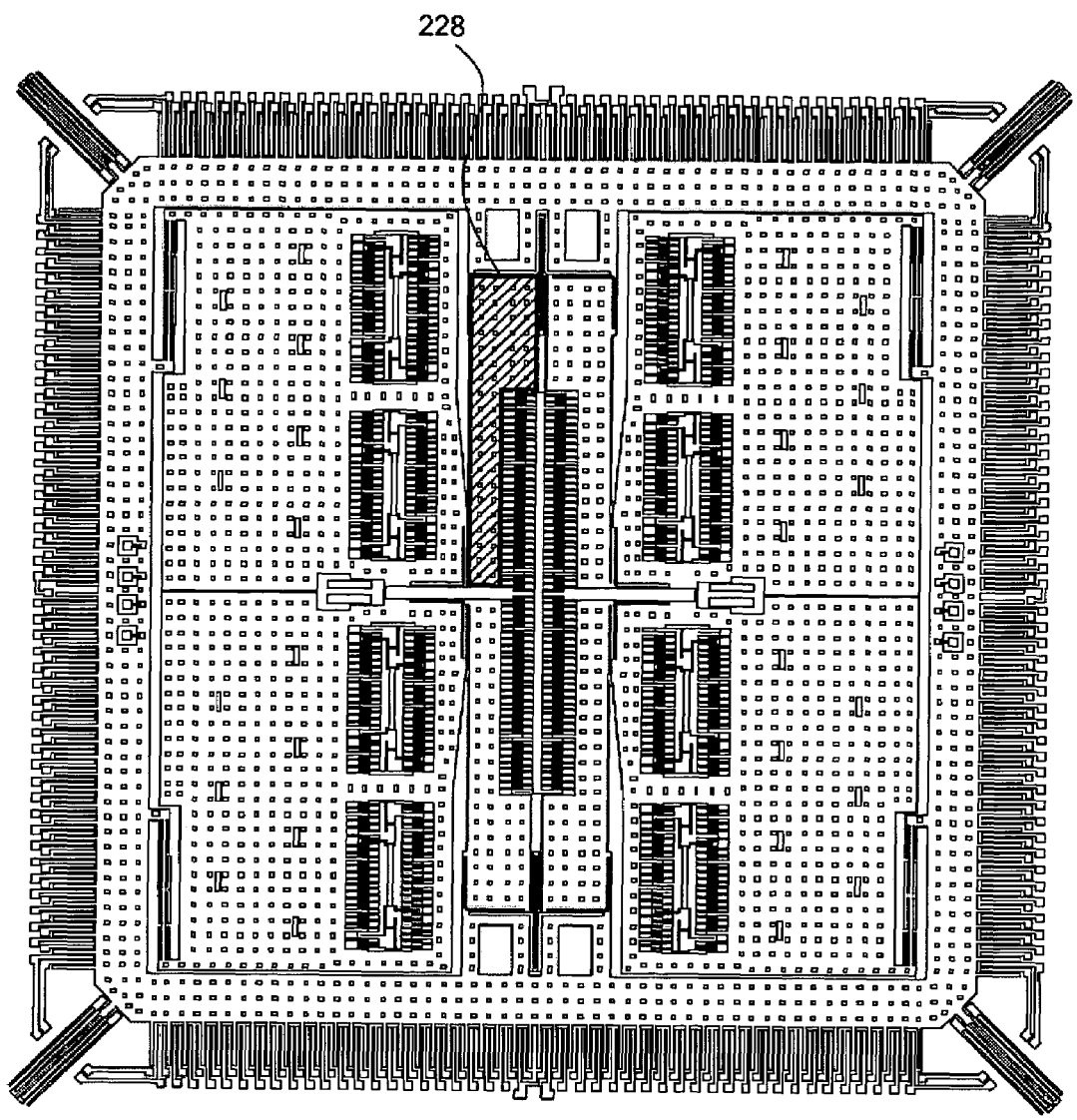
FIG. 5 shows a highlighted view of a lever of the micromachined gyroscope structure in accordance with an embodiment of the present invention.

FIG. 2 identifies various components of the micromachined gyroscope structure 100. Among other things, the micromachined gyroscope structure 100 includes a substantially square frame 210 that is suspended at its four corners by accelerometer suspension flexures 202, 204, 206, and 208. FIG. 3 shows the frame 210 highlighted. On the outside four edges of the frame 210 are fingers 212, 213, 214, 215, 216, 217, 218, and 219. Various resonating structures are suspended within the frame 210. These resonating structures include four movable masses 220, 222, 224, and 226, four levers 228, 230, 232, and 234, and two forks 236 and 238. FIG. 4 shows the mass 220 highlighted. It should be noted that the masses 222, 224, and 226 are substantially the same shape, size, and mass as the mass 220, and are oriented as mirror images of the mass 220 along the x and/or y axes. FIG. 5 shows the lever 228 highlighted. It should be noted that the levers 230, 232, and 234 are substantially the same shape, size, and mass as the lever 228, and are oriented as mirror images of the lever 228 along the x and/or y axes. The four movable masses 220, 222, 224, and 226 are suspended from the frame 210 by flexures 240, 242, 244, and 246, respectively. Movement of the four movable masses 220, 222, 224, and 226 is controlled electrostatically using electrostatic drivers 248, 250, 252, 254, 256, 258, 260, and 262. These and other features of the micromachined gyroscope structure 100 are described in more detail below.

The four accelerometer suspension flexures 202, 204, 206, and 208 help to control movement of the frame 210 relative to the substrate. The four accelerometer suspension flexures 202, 204, 206, and 208 substantially restrict movement of the frame 210 along the x axis and along the y axis (i.e., translational movement), but allow the frame 210 to rotate more freely in either direction (i.e., rotational movement). Such rotational movement of the frame 110 is caused mainly from the Coriolis effect due to movement of the frame of reference of the resonating structures.

Figure 6:
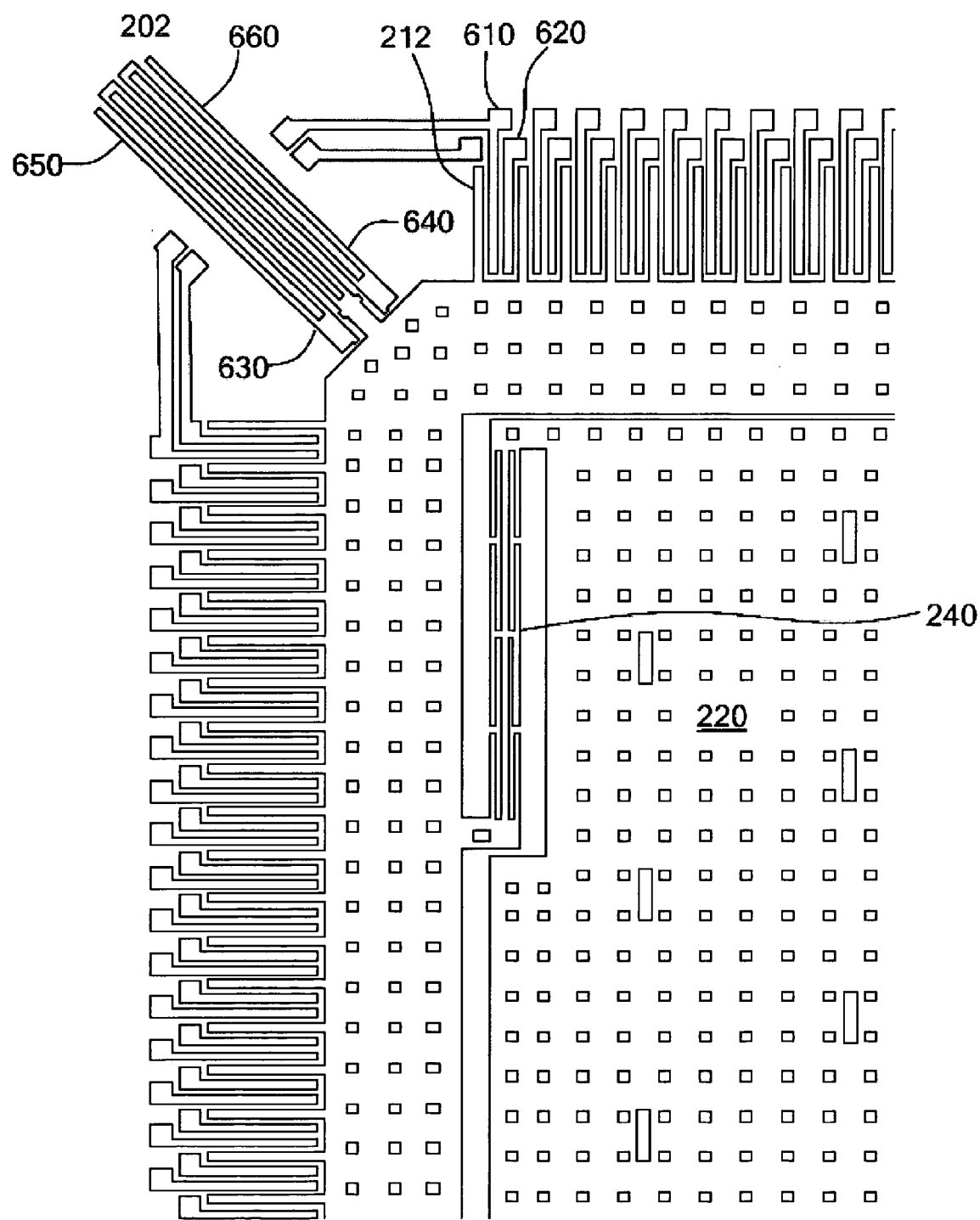
FIG. 6 shows a detailed view of an accelerometer suspension flexure in accordance with an embodiment of the present invention.

FIG. 6 shows the accelerometer suspension flexure 202 in greater detail. The accelerometer suspension flexure 202 is anchored to the substrate at locations 630 and 640. The accelerometer suspension flexure 202 substantially restricts translational movement of the frame 210, but allows for rotational movement of the frame 210. The structures 650 and 660 are etch equalizers that are used to ensure accurate formation of the other flexure structures. This principle is taught in U.S. Pat. No. 6,282,960. It should be noted that the accelerometer suspension flexures 204, 206, and 208 are substantially the same as the accelerometer suspension flexure 202.

The fingers 212, 213, 214, 215, 216, 217, 218, and 219 extend from the four sides of the frame 210. Positioned between the fingers 212, 213, 214, 215, 216, 217, 218, and 219 are two sets of coriolis detectors.

FIG. 6 shows the relationship between a finger 212 and two coriolis detectors 610 and 620.

The two sets of coriolis detectors 610 and 620 are mechanically coupled to the substrate and do not move relative to the substrate. Movement of the frame 210 results in movement of the fingers 212, 213, 214, 215, 216, 217, 218, and 219 relative to the coriolis detectors, as described below. Movement of the fingers 212, 213, 214, 215, 216, 217, 218, and 219 relative to the coriolis detectors produces a change in capacitance that can be measured by electronic circuitry (not shown). This can be done in a variety of ways.

Figure 10:
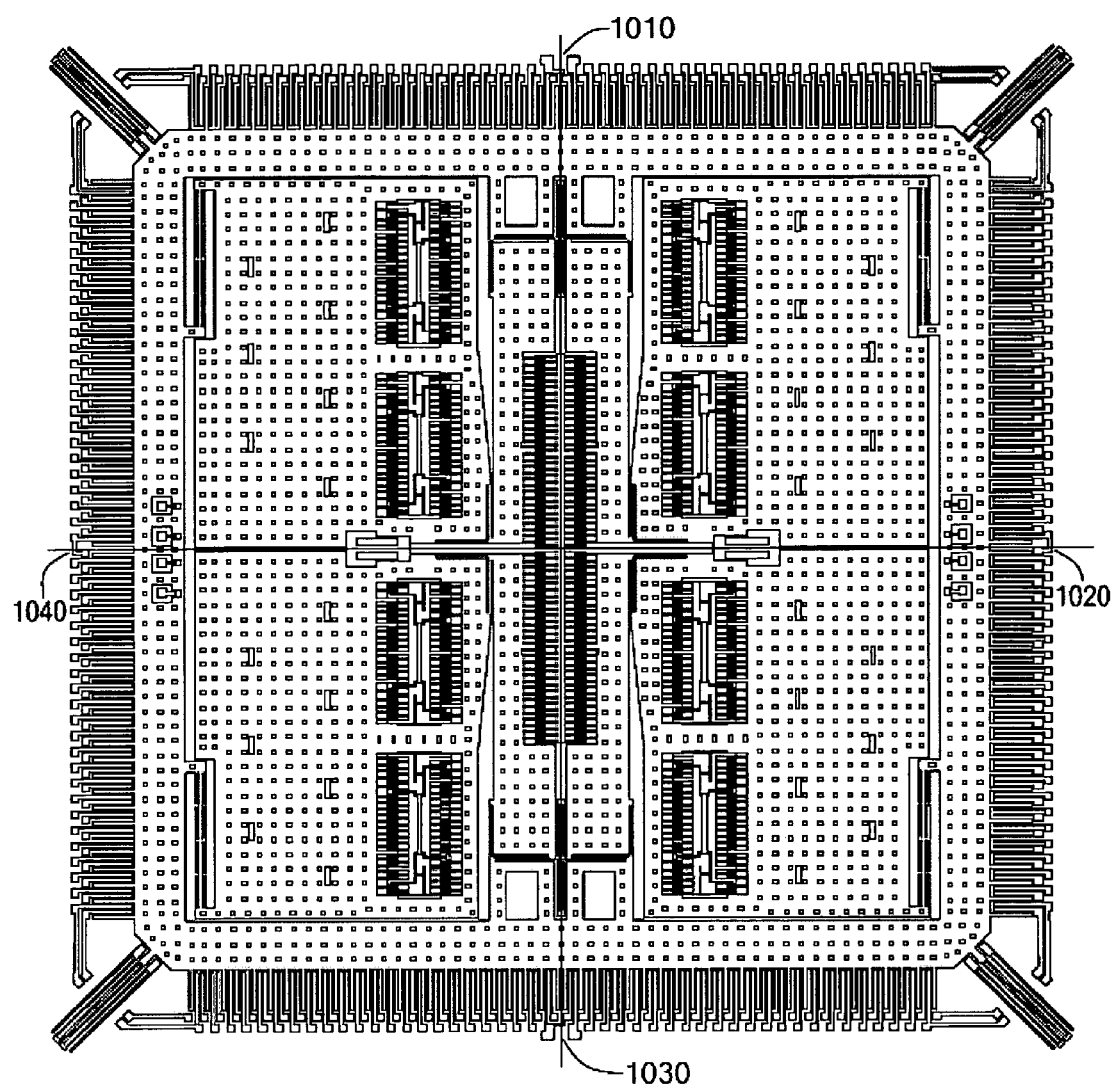
FIG. 10 shows the coriolis detector switch-overs for the double differential configuration in accordance with an embodiment of the present invention.

The two sets of coriolis detectors 610 and 620 are coupled through four switch-overs 1010, 1020, 1030, and 1040 in a double differential fashion, as shown in FIG. 10. The switchovers 1010, 1020, 1030, and 1040 substantially cancel signals induced electrically from surrounding circuits and signals produced by translational movement of the frame 210 but substantially amplify signals produced by rotational movement of the frame 210. Specifically, when there is translational movement of the frame 210, approximately half of the coriolis detectors produce a signal and the other half produce a substantially equal and opposite signal, resulting in a net signal of zero. Thus, translational movements of the frame 210 are substantially canceled out electronically. When there is rotational movement of the frame 210, however, all coriolis detectors produce complementary signals that, when combined and amplified, represent the magnitude of the rotational movement. By placing fingers and coriolis detectors on all sides of the frame 210, a larger signal is produced as opposed to a solution in which fingers and coriolis detectors are placed on only two sides of the frame 210.

The resonating structures, including the masses 220, 222, 224, and 226, the flexures 240, 242, 244, and 246, the levers 228, 230, 232, and 234, and the forks 236 and 238, are mechanically coupled. With reference again to FIG. 2, the masses 220 and 222 are mechanically coupled via a pivot flexure 264, and the masses 224 and 226 are mechanically coupled via a pivot flexure 266. The masses 220 and 224 are mechanically coupled via the levers 228 and 230 and the fork 236, and the masses 222 and 226 are mechanically coupled via the levers 232 and 234 and the fork 238. The pivot flexures 264 and 266, the levers 228, 230, 232, and 234, and the forks 236 and 238 allow the masses 220, 222, 224, and 226 to move together.

The mass 220 is suspended from the frame 210 by the flexure 240, from the mass 222 by the pivot flexure 264, and from the lever 228 by the pivot flexure 268. The mass 222 is suspended from the frame 210 by the flexure 242, from the mass 220 by the pivot flexure 264, and from the lever 232 by the pivot flexure 272. The mass 224 is suspended from the frame 210 by the flexure 244, from the mass 226 by the pivot flexure 266, and from the lever 230 by the pivot flexure 276. The mass 226 is suspended from the frame 210 by the flexure 246, from the mass 224 by the pivot flexure 266, and from the lever 234 by the pivot flexure 280.

The lever 228 is suspended from the frame 210 by the pivot flexure 270, from the mass 220 by the pivot flexure 268, and from the lever 230 by the fork 236. The lever 230 is suspended from the frame 210 by the pivot flexure 278, from the mass 224 by the pivot flexure 276, and from the lever 228 by the fork 236. The lever 232 is suspended from the frame 210 by the pivot flexure 274, from the mass 222 by the pivot flexure 272, and from the lever 234 by the fork 238. The lever 234 is suspended from the frame 210 by the pivot flexure 282, from the mass 226 by the pivot flexure 280, and from the lever 232 by the fork 238.

Figure 7:
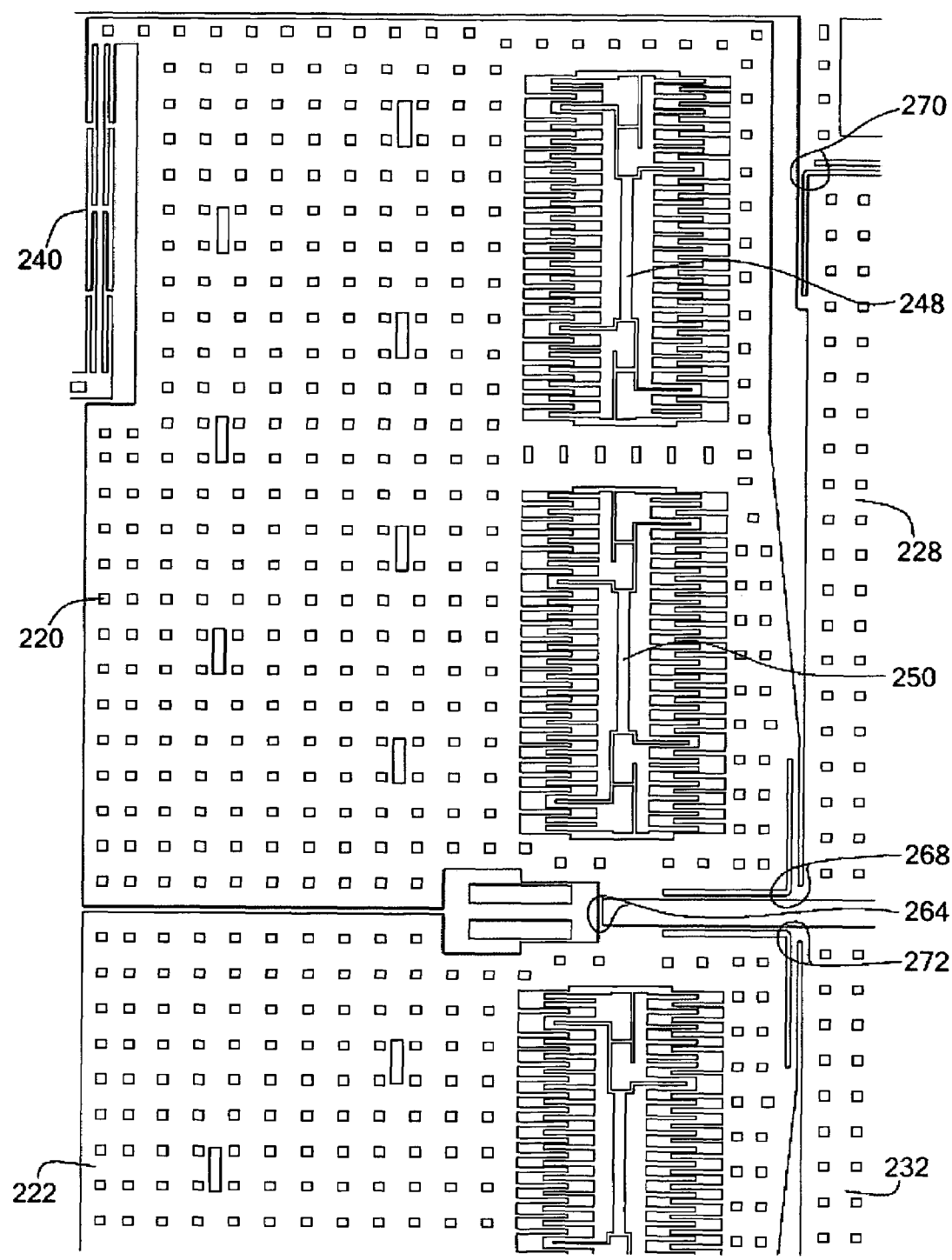
FIG. 7 shows a detailed view of a movable mass and its related flexures and pivot flexures in accordance with an embodiment of the present invention.

FIG. 7 shows the mass 220 and related components in greater detail. The mass 220 is suspended from the frame 210 by the flexure 240, from the mass 222 by the pivot flexure 264, and from the lever 228 by a pivot flexure 268. The flexure 240 is preferably formed from three parallel etches, where the center etch is unbroken and the outer etches are broken in two places. The outer etches are etch equalizers that are used to ensure accurate formation of the center etch. It should be noted that the masses 222, 224, and 226 and their related components are substantially the same as the mass 220 and its related components.

Figure 8:
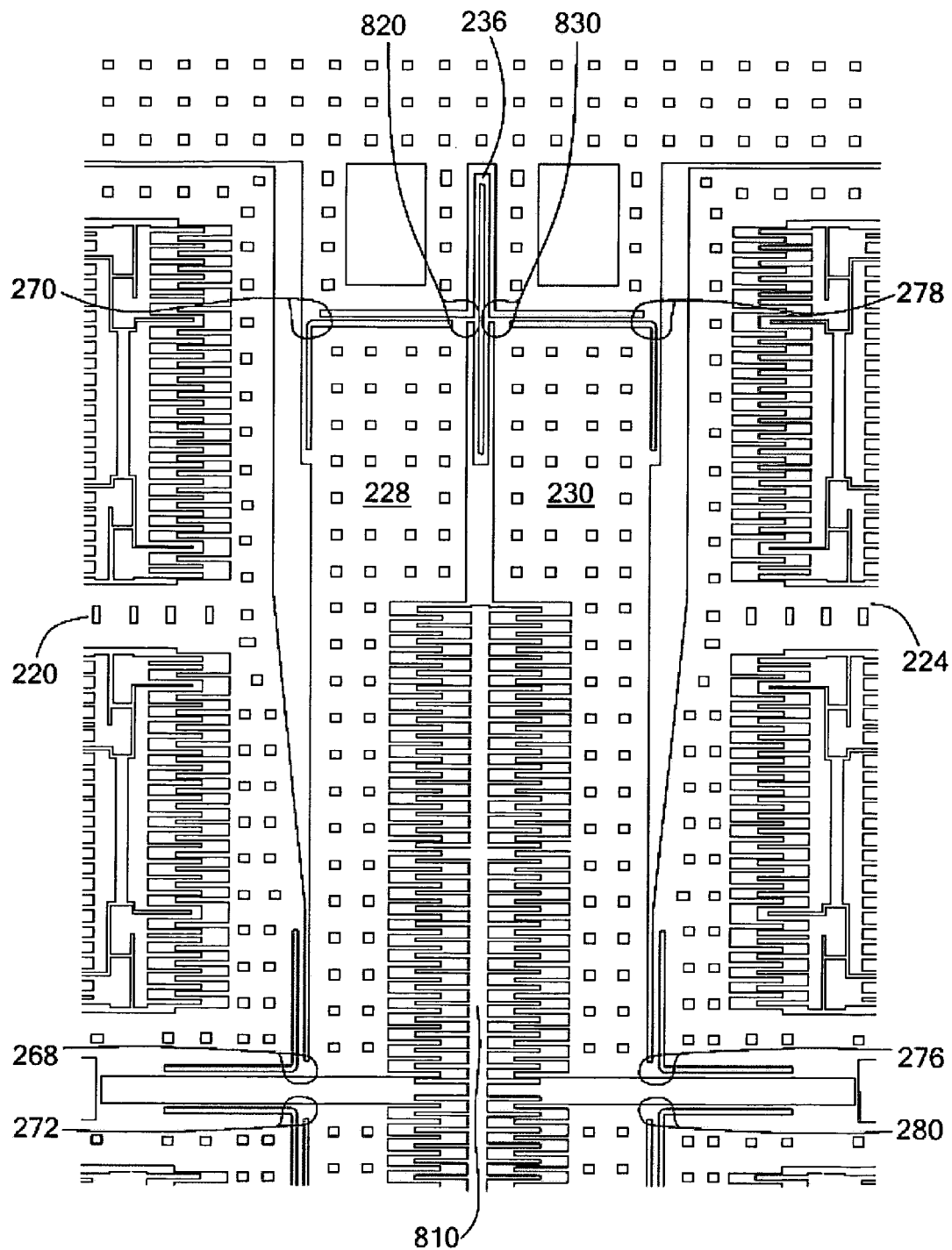
FIG. 8 shows a detailed view of two levers and a fork and their related pivot flexures and electrostatic driver in accordance with an embodiment of the present invention.

FIG. 8 shows the levers 228 and 230 and their related components in greater detail. The lever 228 is suspended from the frame 210 by the pivot flexure 270, from the mass 220 by the pivot flexure 268, and from the fork 236 by the pivot flexure 820. The lever 230 is suspended from the frame 210 by the pivot flexure 278, from the mass 224 by the pivot flexure 276, and from the fork 236 by the pivot flexure 830. The fork 236 is suspended from the lever 228 by the pivot flexure 820 and from the level 230 by the pivot flexure 830. It should be noted that the levers 232 and 234 and their related components are substantially the same as the levers 228 and 230 and their related components.

The flexures 240, 242, 244, and 246 substantially restrict movement of the masses 220, 222, 224, and 226 respectively along the y axis, but allow movement of the masses 220, 222, 224, and 226 respectively along the x axis. The flexures 240, 242, 244, and 246 also allow the masses 220, 222, 224, and 226 respectively to pivot slightly as they move.

The pivot flexure 264 essentially locks the masses 220 and 222 together so that they move together. Likewise, the pivot flexure 266 essentially locks the masses 224 and 226 together so that they move together (although oppositely to the masses 220 and 222).

The levers 228 and 230, the fork 236, and the pivot flexures 268, 270, 820, 830, 276, and 278 essentially lock the masses 220 and 224 together so that they move in substantially equal but opposite directions. The levers 232 and 234, the fork 238, the pivot flexures 272, 274, 280, and 282, and the pivot flexures coupling the levers 232 and 234 to the fork 238 (not shown) essentially lock the masses 222 and 226 together so that they move in substantially equal but opposite directions.

The levers 228 and 230 essentially translate the substantially equal but opposite side-to-side motion of the masses 220 and 224 into a substantially linear motion of the fork 236 along the y axis. Specifically, the side-to-side motion of the mass 220 is transferred to the lever 228 through the pivot flexure 268, while the side-to-side motion of the mass 224 is transferred to the lever 230 through the pivot flexure 276. The levers 228 and 230 pivot at pivot flexures 270 and 278, respectively, and at pivot flexures 820 and 830, respectively, to cause the linear motion of the fork 236 along the y axis. These transfers cause the masses 220 and 224 to pivot slightly as they move side-to-side. Specifically, the mass 220 pivots slightly toward the mass 222 when moving to the left and slightly away from the mass 222 when moving to the right, while the mass 224 pivots slightly toward the mass 226 when moving to the right and slightly away from the mass 226 when moving to the left.

Likewise, the levers 232 and 234 essentially translate the substantially equal but opposite side-to-side motion of the masses 222 and 226 into a substantially linear motion of the fork 238 along the y axis. Specifically, the side-to-side motion of the mass 222 is transferred to the lever 232 through the pivot flexure 272, while the side-to-side motion of the mass 226 is transferred to the lever 234 through the pivot flexure 280. The levers 232 and 234 pivot at pivot flexures 274 and 282, respectively, and at the pivot flexures coupling the levers 232 and 234 to the fork 238 (not shown), respectively, to cause the linear motion of the fork 238 along the y axis. These transfers cause the masses 222 and 226 to pivot slightly as they move side-to-side. Specifically, the mass 222 pivots slightly toward the mass 220 when moving to the left and slightly away from the mass 220 when moving to the right, while the mass 226 pivots slightly toward the mass 224 when moving to the right and slightly away from the mass 224 when moving to the left.

It should be noted that the symmetry of the resonator together with the precision of the antiphase motion causes the angular momenta from the pivoting motions to cancel and not induce rotation of the accelerometer frame.

Figure 9:
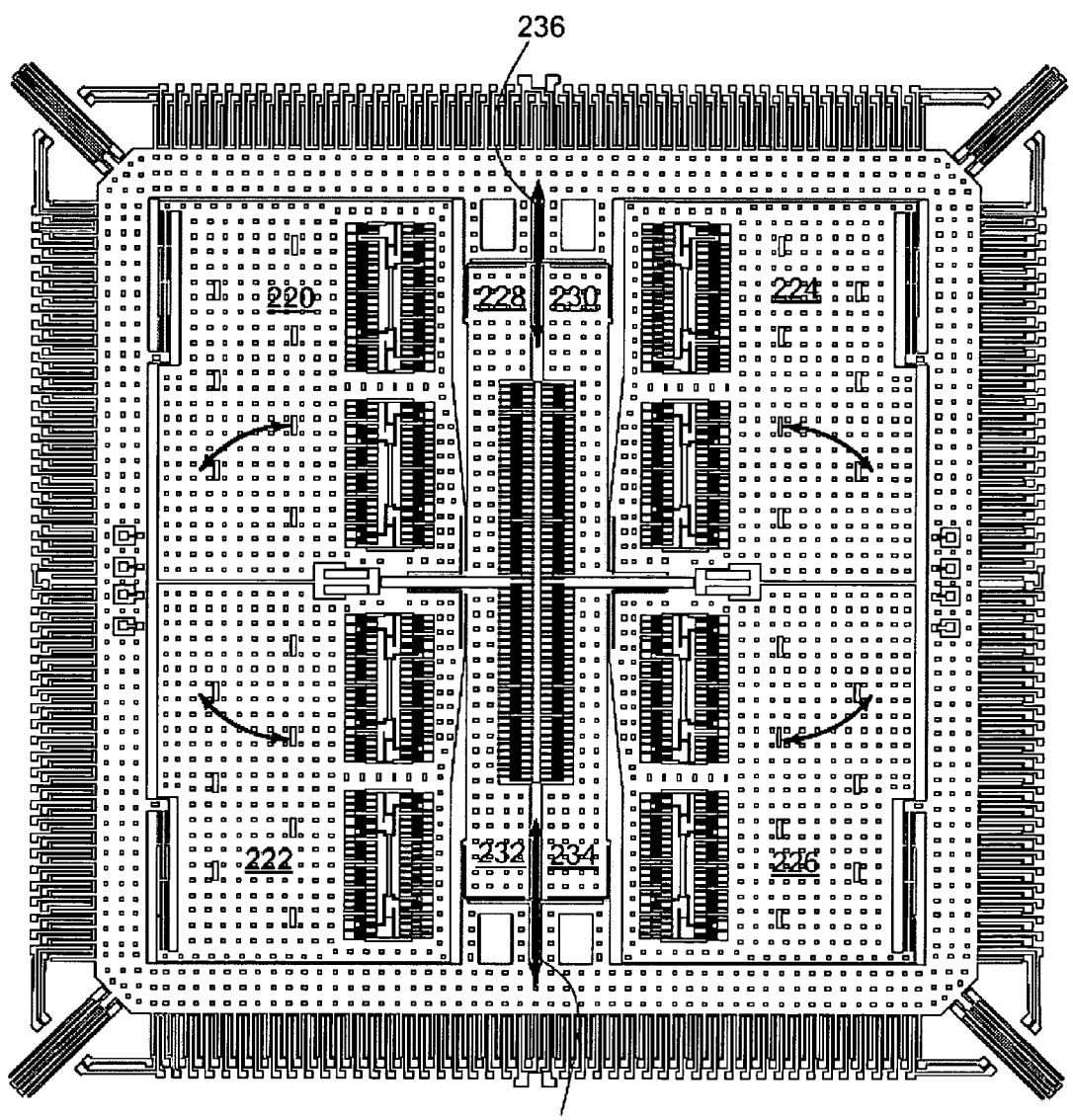
FIG. 9 shows a representation of the motions of the various resonating structures of the micromachined gyroscope structure in accordance with an embodiment of the present invention.

FIG. 9 shows the relative movement of the masses 220, 222, 224, and 226 and the forks 236 and 238. It should be noted that, in actuality, these and other resonator structures move extremely small distances, and the arrows are greatly exaggerated to show that the masses 220, 222, 224, and 226 move side-to-side and pivot.

As discussed above, the masses are preferably moved and controlled electrostatically using electrostatic drivers. The drive fingers typically work longitudinally using interdigitated combs, some moving, and some attached to the substrate. The principle is one described by Tang and Howe in U.S. Pat. No. 5,025,346. One of the most troublesome side effects of using longitudinal electrostatic comb drives for gyroscopes is that small imbalances of the gaps between the fingers induce lateral motion as well as the desired longitudinal component. This motion has a component with the unfortunate property of being in-phase with the Coriolis signal so that, unlike the much larger quadrature signal, it cannot be rejected by a phase sensitive rectifier. Any instability of this in-phase signal becomes directly a gyroscope error. One of the most significant ways in which the gaps can become imbalanced is by relative motion of the substrate anchor points of the fixed fingers and the moving structure. Another is the displacement of the moving structure from external accelerations. Fortunately, most of these can be made to cancel by careful attention to the symmetries of the structure and the drive apparatus. However, surface shear distortion of the substrate is particularly difficult to accommodate in this way. It is easily caused by variations in package stress induced during use and produces both a relative displacement of arrays of fixed fingers and a rotation of the individual finger anchors.

In certain embodiments of the present invention, the anchors for pairs of antiphase arrays of fixed drive fingers are arranged to be co-linear in the lateral direction. In this way, any surface shear of the substrate will not cause them to move laterally with respect to each other. Also, the anchors are typically laid down in pairs joined to each other at the top ends, remote from the substrate, so that the tops resist the individual twisting at the substrate end. Furthermore, finger busbars are typically attached to the top ends by flexible, folded fingers. These provide isolation of the busbar from distortion transmitted by the anchor pairs and from displacement by shrinkage stresses in the micromachined material. They also serve as drivers, thereby minimizing the loss of drive from the isolation measures. The finger attachment means provide about an order of magnitude improvement in the gyroscope performance in an exemplary embodiment of the invention.

Figure 11:
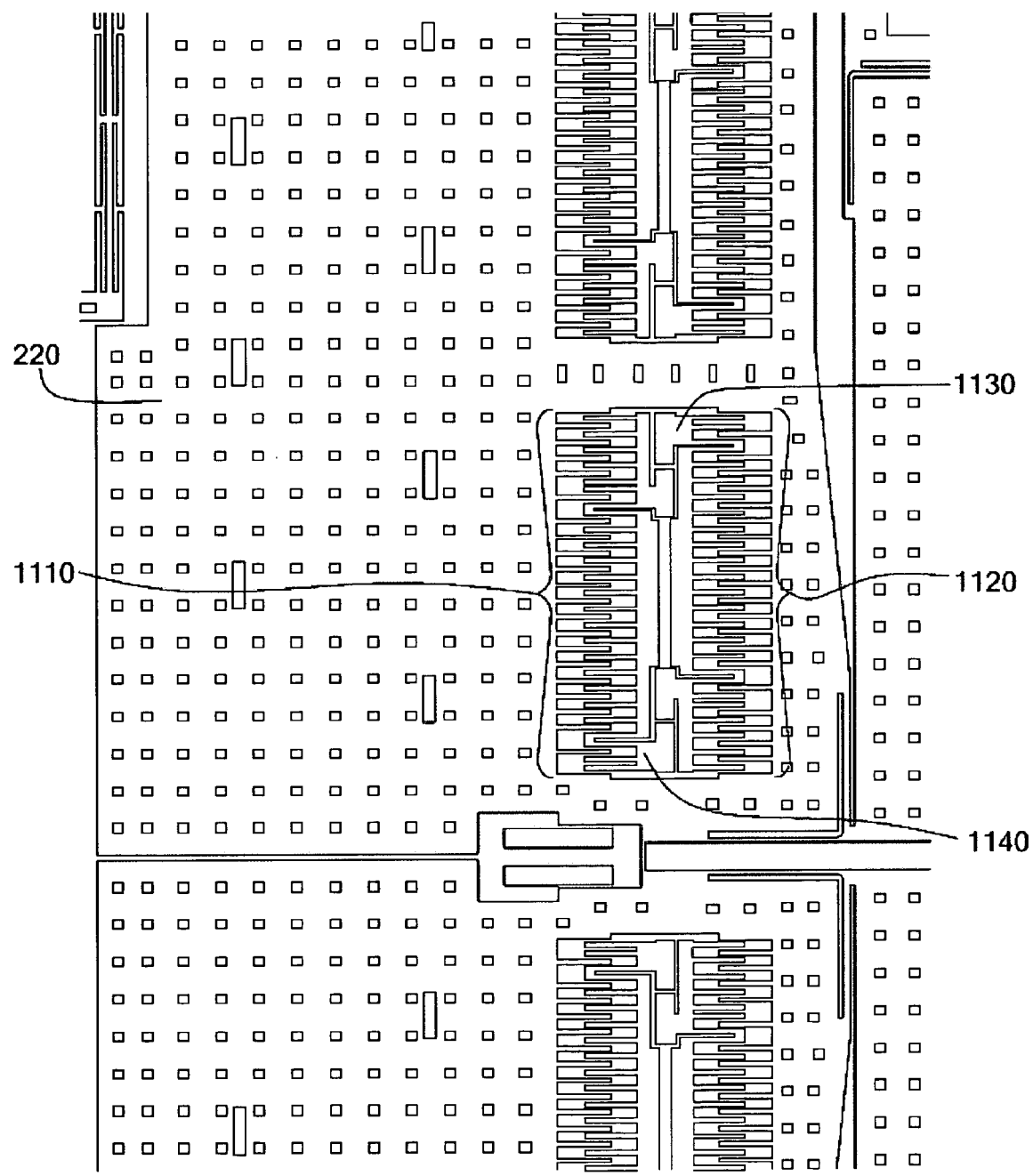
FIG. 11 shows a detailed view of an electrostatic driver for a movable mass in accordance with an embodiment of the present invention.

FIG. 11 shows a detailed view of an electrostatic driver, and, in particular, the electrostatic driver 250 for mass 220, in accordance with an embodiment of the present invention. The electrostatic driver 250 is micromachined so as to form a cavity within the mass 220 that includes two sets of drive fingers 1110 and 1120 that are integral to the mass 220 and two sets of electrode fingers 1130 and 1140 that are disposed within the cavity and are coupled to the substrate. The electrode fingers 1140 fit around and between the drive fingers 1110, and the electrode fingers 1130 fit around and between the drive fingers 1120. When a voltage is applied to the electrode fingers 1140, the drive fingers 1110 are pulled toward the electrode fingers 1140, generating a force on the mass 220 toward the right. When a voltage is applied to the electrode fingers 1130, the drive fingers 1120 are pulled toward the electrode fingers 1130, generating a force on the mass 220 toward the left. Applying voltages alternately to the electrode fingers 1130 and to the electrode fingers 1140 causes the mass to move back and forth. The two sets of electrode fingers 1130 and 1140 are preferably anchored to the substrate linearly in order to reduce torque produced by surface shear of the substrate that can produce torque on the mass 220. It should be noted that the electrostatic drivers 248, 252, 254, 256, 258, 260, and 262 are substantially the same as the electrostatic driver 250.

It should be noted that the electrostatic drivers 248, 252, 254, 256, 258, 260, and 262 are positioned close to the middle of the micromachined gyroscope structure 100 so that most of the mass is away from the center. This increases the sensitivity of the micromachined gyroscope structure 100 to Coriolis accelerations.

In an embodiment of the present invention, the levers 228, 230, 232, and 234 include electrostatic fingers that mesh with a set of electrode fingers that are coupled to the substrate. These fingers are preferably used for sensing movement of the levers as part of a control loop for controlling the electrostatic drivers that act directly on the masses, although the fingers could alternatively be used as drivers to place forces directly on the levers (e.g., to reinforce the movement of the resonating structures). FIG. 8 shows a portion of the electrostatic fingers 810 for the levers 228, 230, 232, and 234. The electrostatic fingers 810 are micromachined so as to form fingers on each lever and a set of electrode fingers that are coupled to the substrate. The electrode fingers fit around and between the lever fingers. When operating as sensors, the electrode fingers sense changes in capacitance caused by movement of the lever fingers relative to the electrode fingers. When operating as drivers, a voltage applied to the electrode fingers pulls the lever fingers toward the electrode fingers, generating a force on each lever toward the electrode fingers.

It should be noted that the resonating structures are preferably driven at or near their natural resonance frequency in order to enhance the range of motion of the resonating structures. This in turn increases the sensitivity of the gyroscope.

It should be noted that, in theory, the various gyroscope structures are perfectly balanced so that they move with substantially the same frequency and phase. In practice, however, the various gyroscope structures are not perfectly balanced. For example, the masses 220, 222, 224, and 226 are theoretically identical (albeit mirror images in the x and/or y axes), but typically are not identical due at least in part to variations in the material and processes used to form the masses. Similar imbalances can occur in other gyroscope structures, such as the various levers, pivots, and flexures. These imbalances can manifest themselves in out-of-phase lateral movements of the masses (referred hereinafter to as "quadrature"), and can vary from device to device. The mechanical stiffnesses of the structures substantially suppresses these motions, but there is some residual quadrature.

Therefore, electrical quadrature suppression structures are typically used to reduce the amount of quadrature. The general principle was taught by Clark in U.S. Pat. No. 5,992,233. In an embodiment of the present invention, a quadrature suppression structure typically includes at least one electrode located proximately to a portion of a mass along the direction of motion of the mass. When a voltage is applied to the electrode, a resulting electrostatic force produces a lateral force that attracts the mass toward the electrode. A single electrode is typically associated with each mass, although not all electrodes are typically activated. Rather, the quadrature behavior of a particular device is typically characterized to determine which (if any) electrodes to activate to reduce the quadrature.

Because the amount of quadrature varies with the movement of the mass, it is preferable for the lateral force applied by the electrode to likewise vary with the movement of the mass.

One way to vary the lateral force applied to the mass by the electrode is to vary the voltage applied to the electrode based upon the position of the mass. Specifically, the voltage would be increased as the mass moves outward toward the frame and would be decreased as the mass moves inward away from the frame. Such a solution would be very difficult in practice.

Figure 12:
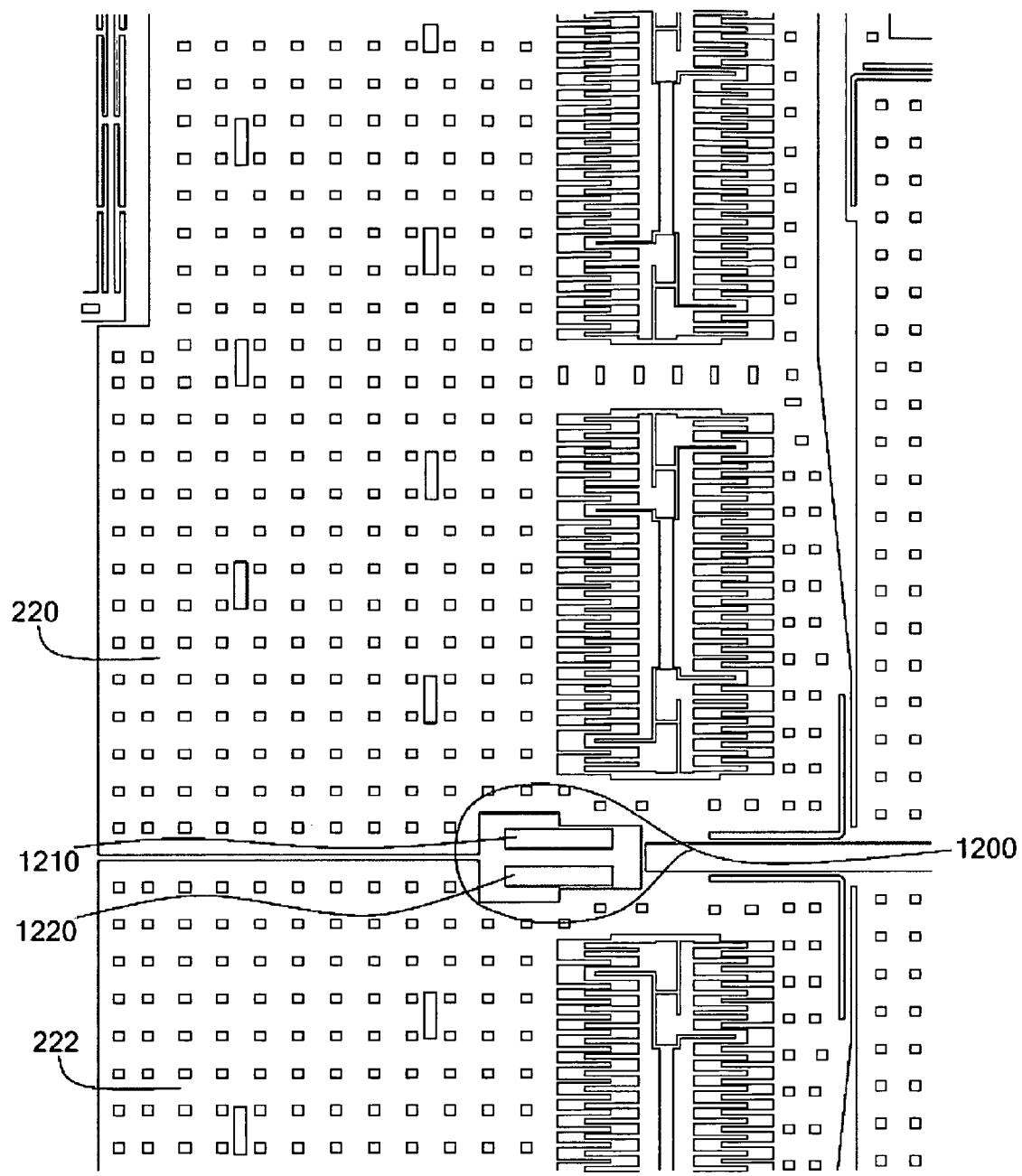
FIG. 12 shows a detailed view of quadrature suppression structures in accordance with an embodiment of the present invention.

Another way to vary the lateral force applied to the mass by the electrode is to vary the amount of the mass that is adjacent to the electrode based upon the position of the mass. FIG. 12 shows a detailed view of a quadrature suppression structure 1200 in accordance with an embodiment of the present invention. Two electrodes 1210 and 1220 are placed between two adjacent masses 220 and 222, specifically in a cavity formed in and by the two masses 220 and 222. The electrode 1210 is adjacent to the mass 220, and is capable of applying a lateral force on the mass 220 in the downward direction. The electrode 1220 is adjacent to the mass 222, and is capable of applying a lateral force on the mass 222 in the upward direction. In order to vary the amount of lateral force applied by an electrode, a notch is formed in each mass. The notch is formed adjacent to a portion of the electrode toward the end of the electrode closer to the frame. As the mass moves outward toward the frame, the length of mass that is directly adjacent to the electrode increases, resulting in a larger lateral force applied to the mass. As the mass moves inward away from the frame, the length of mass that is directly adjacent to the electrode decreases, resulting in a smaller lateral force applied to the mass.

In a typical embodiment of the present invention, a voltage is applied to one but not both of the electrodes 1210 and 1220. The electrode to which a voltage is applied is typically selected by characterizing the quadrature and determining the electrode (if any) that most decreases the quadrature.

It should be noted that a similar quadrature suppression structure is formed between the masses 224 and 226. In order to cancel out static forces, it is common to activate one electrode between the masses 220 and 222 and one electrode between the masses 224 and 226.

It should be noted that the position of the quadrature suppression electrodes is not limited to a cavity at the juncture between two masses. The electrodes can be placed in other positions. The positions of the various electrodes should be balanced. The electrodes generally produce a certain amount of torque on the mass, and the amount of torque depends at least to some degree on the position of the electrode. A small amount of torque is generally not a problem.

In a typical embodiment of the invention, a constant voltage is applied to the electrode. This generally produces good results. Alternatively, the voltage applied to the electrode can be varied. When done properly, this can result in improved quadrature suppression, but at the cost of increased complexity.

Although FIGS. 1 and 2 show the accelerometer suspension flexures 202, 204, 206, and 208 positioned at the four corners of the frame, it should be noted that the present invention is not limited to such positioning of accelerometer suspension flexures. Rather, accelerometer suspension flexures can be positioned at various points along the frame. The accelerometer suspension flexures preferably restrict translational movement of the frame while allowing rotational movement of the frame about the center of mass. This can be accomplished by positioning the accelerometer suspension flexures such that the linear axis between each pair of opposing accelerometer suspension flexures passes through the gyroscope's effective center of mass.

Various aspects of the present invention are described in greater detail in attachment pages A-1 through A-9 of the provisional applications incorporated by reference above.

Figure 13:
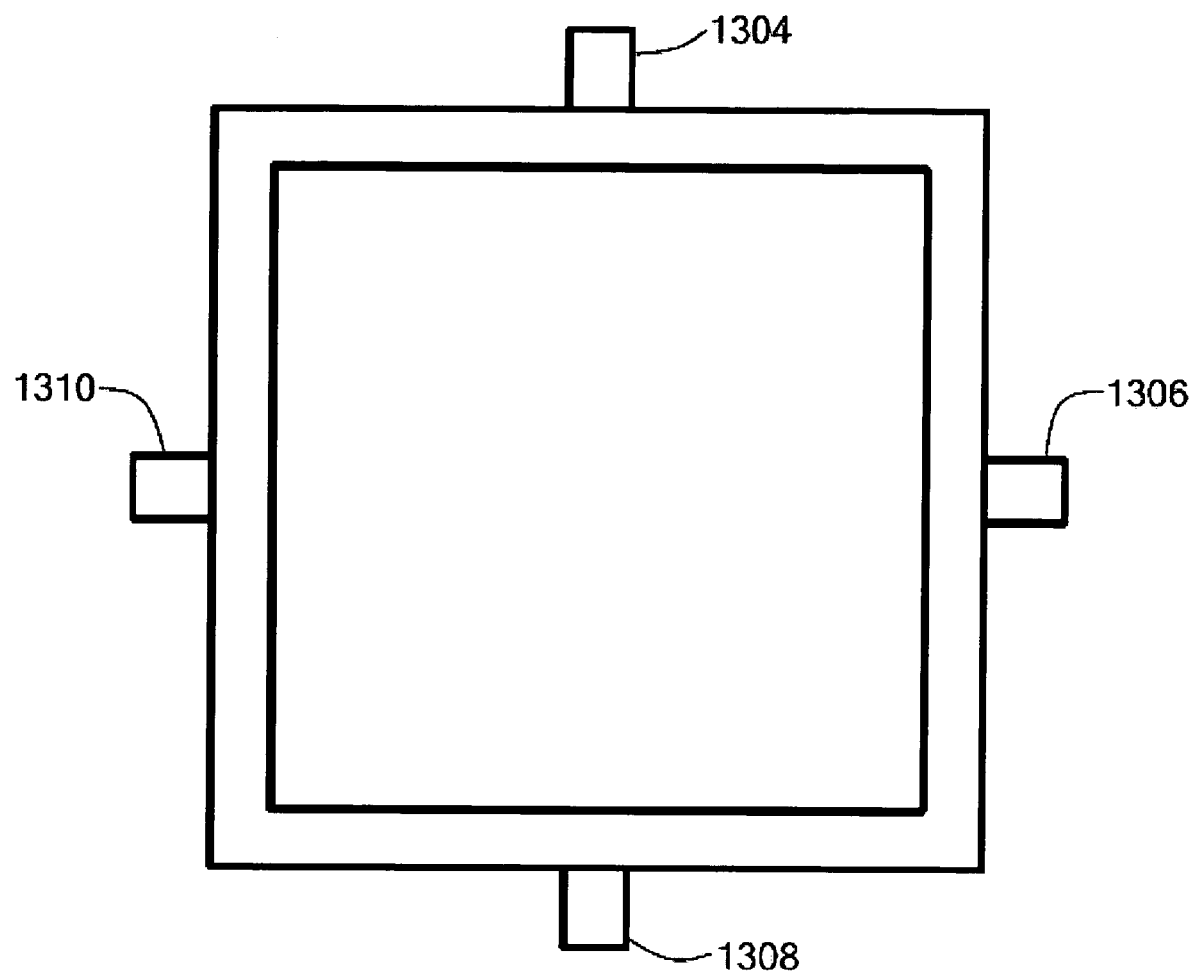
FIG. 13 shows an alternate frame suspension configuration in accordance with an embodiment of the present invention.

In an alternate embodiment of the present invention, the accelerometer suspension flexures are placed at the middle of the four sides of the frame rather than at the four corners of the frame. FIG. 13 shows an alternate frame suspension configuration in accordance with an embodiment of the present invention. In this embodiment, four accelerometer suspension flexures 1304, 1306, 1308, and 1310 are placed at the middle of the four sides of the frame 1302. There are certain production advantages to such a placement of the accelerometer suspension flexures. Specifically, certain etching equipment produces etches based upon a rectilinear grid, so it is easier to produce features that are aligned with the grid (as the side-positioned flexures would be) compared to features that are set at an angle to the grid (as the corner-positioned flexures would be). The corner-positioned flexures are also not particularly space efficient.

With reference again to FIG. 2, it can be seen that the levers 228, 230, 232, and 234 move with substantially arcuate motions. Therefore, the interdigitated lever fingers mesh with the electrode fingers at different angles along its length, depending on the radius from the pivot points 270, 278, 274, and 282 of the levers 228, 230, 232, and 234, respectively. Therefore, in order to prevent the moving fingers from excessive lateral motion with respect to a fixed, interdigitated comb, the fingers may be raked back at varying angles as dictated by the geometry of the levers.

Figure 14:
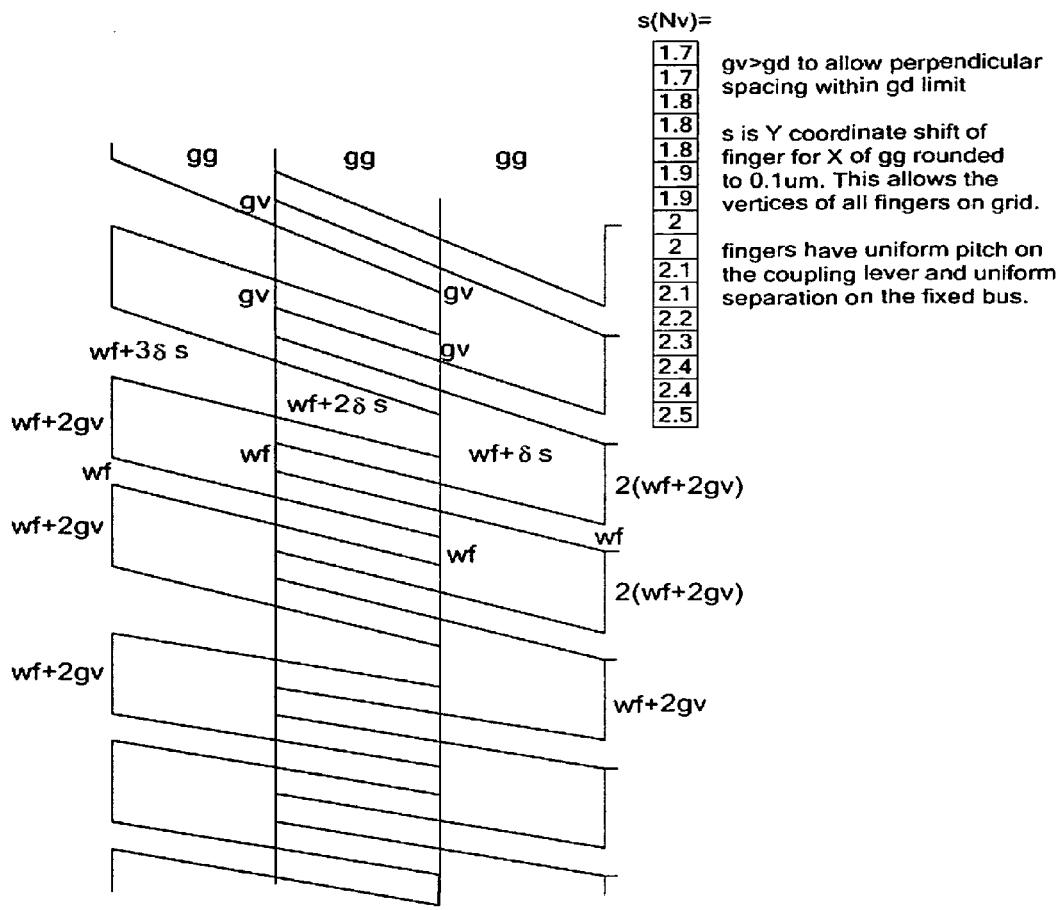
FIG. 14 is a schematic diagram showing the conceptual geometry of lever and corresponding electrode fingers that are raked back at varying angles to accommodate the arcuate motion of the coupling levers in accordance with an embodiment of the present invention.
Figure 20:
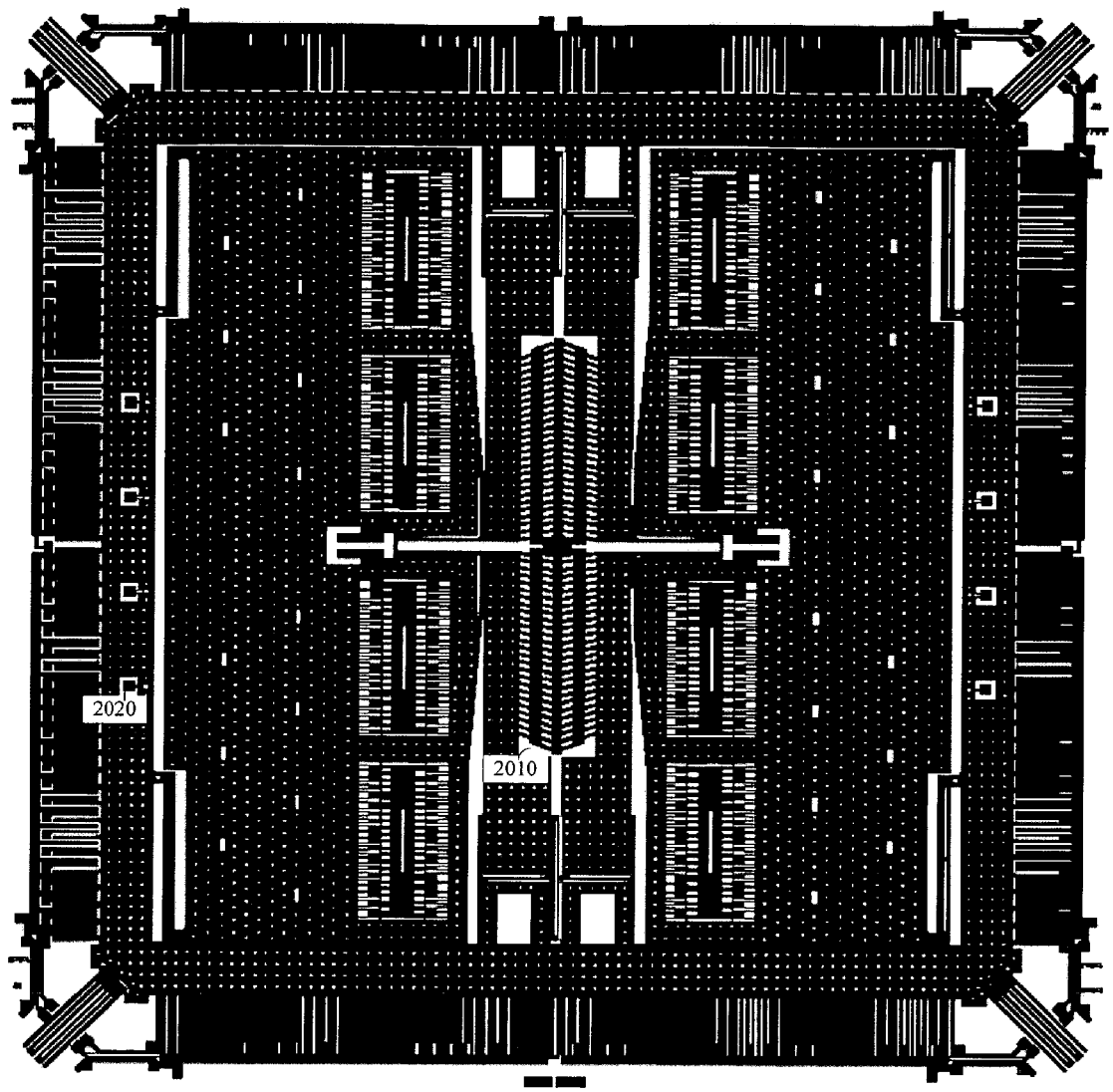
FIG. 20 shows an exemplary embodiment of the present invention including folded corner suspensions, with lever and corresponding electrode fingers 2010 raked back at varying angles in accordance with an embodiment of the present invention.

FIG. 14 is a schematic diagram showing the conceptual geometry of lever and corresponding electrode fingers that are raked back at varying angles to accommodate the arcuate motion of the coupling levers in accordance with an embodiment of the present invention. FIG. 20 shows an exemplary embodiment of the present invention including folded corner suspensions, with lever and corresponding electrode fingers 2010 raked back at varying angles in accordance with an embodiment of the present invention. FIG. 21 shows an exemplary embodiment of the present invention including box corner suspensions, with lever and corresponding electrode fingers 2110 raked back at varying angles in accordance with an embodiment of the present invention.

A similar issue exists with the accelerometer frame and the sensing fingers placed around its periphery, since the accelerometer frame is adapted to rotate. Therefore, the sensing finger could likewise be raked back at varying angles. However, the rotation of the accelerometer frame is typically much less than the rotation of the levers (perhaps $1/100,000^{th}$), so such raking is typically not used for the sensing fingers.

Certain embodiments of the present invention include structures for testing g-sensitivity while still in wafer form, without having to assemble the device and perform mechanical testing. The structures are typically balanced across the center line of the gyroscope, and are used to place forces on the frame for detecting imbalances in the suspensions and other components. FIG. 21 shows exemplary structures for testing g-sensitivity in accordance with an embodiment of the present invention. The structures include, at one side of the frame 1811, a bracket 2140 connected to the frame 1811 and an opposed pair of electrodes 2141 and 2142, and at the opposite side of the frame 1811, a bracket 2150 connected to the frame 1811 and an opposed pair of electrodes 2151 and 2152. Placing an electrical potential on the electrodes 2141 and 2152 places a downward force on the frame 1811, while placing an electrical potential on the electrodes 2142 and 2152 places an upward force on the frame 1811. These forces are produced on the frame while monitoring the null output of the gyroscope produced through the sensing fingers 2160. An imbalance will generally show up as a shift in the null output of the gyroscope.

In the embodiment shown in FIG. 21, space is made for the brackets 2140 and 2150 by using fewer but longer sensing fingers 2160 placed in clusters near the corners of the frame. By using longer fingers, the fingers 2160 have substantially the same overlap area as the sensing fingers of an embodiment shown in FIG. 2 or FIG. 20, and therefore produce substantially the same output signal. By using fewer fingers, there are fewer anchors to the underlying substrate. Anchors are a significant source of capacitance. Capacitance determines, to a large degree, the noise gain of the input amplifier. One advantage of having fewer anchors is that there is generally lower noise gain of the input amplifier compared to an embodiment having a larger number of anchors.

This configuration of sensing fingers 2160 also makes room for self-test electrodes to be located outside of the frame 1811. Self-test fingers are typically used to test the gyroscope, specifically by placing various forces on the frame so that the operation of the gyroscope can be tested. In the embodiment shown in FIG. 20, self-test electrodes 2020 (four on each of two opposite sides of the frame) are integral to the frame itself. Among other things, this saves space, but makes the frame thicker that it might otherwise need to be. In the embodiment shown in FIG. 21, self-test electrodes 2120 (for on each of two opposite sides of the frame) are outside of the frame 1811. Among other things, this allows the frame to be thinner than in the embodiment shown in FIG. 20. A thinner frame generally has less inertia, and therefore provides more sensitivity, than a thicker frame.

Figure 22:
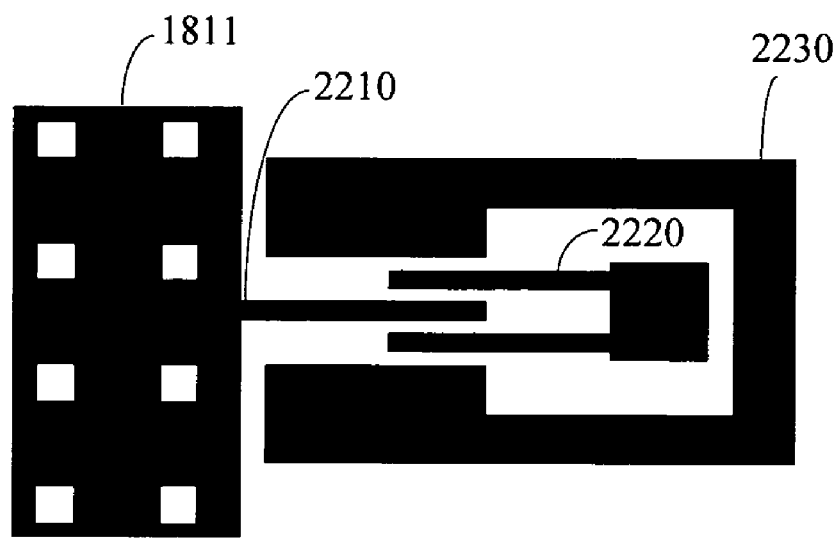
FIG. 22 shows the configuration of a self-test electrode in accordance with an embodiment of the present invention.

FIG. 22 shows the configuration of a self-test electrode 2120 in accordance with an embodiment of the present invention. The electrode includes a finger 2210 coupled to the frame 1811, drive fingers 2220 that are anchored to the substrate, and a shield 2230 substantially surrounding the finger 2210 and the drive fingers 2220. The frame 1811, finger 2210, and shield 2230 are typically maintained at the same potential. The drive fingers 2220 are set to a different potential to cause a force to be placed on the finger 2210 and, therefore, on the frame 1811. Among other things, the shield 2230 produces a "fringing field" substantially equal to that of the electrostatic drivers that drive the vibrating masses in order to produce a well-defined force on the frame 1811 that can be used to test and calibrate the gyroscope.

In embodiments of the invention shown in FIG. 2 and FIG. 20, the forks 236 and 238 and their surrounding structures form empty rectangular areas. In certain embodiments of the present invention, trim electrodes are formed within these areas. FIG. 21 shows trim electrodes 2130 (four altogether) formed in those areas. The trim electrodes are typically used to cancel various interference signals, specifically by placing an electrical potential on one or more of the trim electrodes (if and as needed). The configuration of the trim electrodes 2130 are substantially the same as the configuration of the self-test electrodes 2120 shown in FIG. 22.

The gyroscope is typically produced by depositing an oxide layer (approximately 2 um thick) on top of a substrate (approximately 600 um thick), using photolithography on the oxide layer to produce holes at desired locations (and particularly at locations where the micromachined gyroscope structure 100 is to be coupled to the substrate), depositing a polysilicon layer (approximately 4 um thick) over the oxide layer which forms a thin film that bonds to the substrate through the holes in the oxide, using photolithography on the polysilicon layer to produce the complex structures of the micromachined gyroscope structure 100, and removing the oxide layer using hydrofluoric acid. Thus, the resulting micromachined gryoscope structure 100 is suspended approximately 2 um above the substrate. It should be noted from the various drawings that the micromachined gyroscope structure 100 has a large number of holes, particularly in the masses 220, 222, 224, and 226, the levers 228, 230, 232, and 234, and the frame 210. These holes are formed in the micromachined gyroscope structure 100 in order to allow the hydrofluoric acid to flow sufficiently through to the oxide layer. If such a micromachined gyroscope structure 100 was placed in a vacuum, the micromachined gyroscope structure 100 would typically be extremely fragile and would typically have a high resonance frequency that tends to ring. By operating the micromachined gyroscope structure 100 in air, the air cushions the micromachined gyroscope structure 100 and reduces ringing.

It should be noted that a micromachined gyroscope of the present invention typically operates in air rather than a vacuum. Operation in air has a number of advantages and disadvantages. On one hand, air tends to impede the motion of moving components due to viscous damping resulting in smaller output signals, tends to give a phase shift that spoils synchronous rectification, and tends to cause noise due to the impact of air molecules (brownian motion) resulting in reduced signal-to-noise ratio. On the other hand, however, operation in air enables the micromachined gyroscope to be a thin film structure, provides air cushioning that makes the thin film structure rugged, and eliminates the need for hermetic sealing of the gyroscope package resulting in a lower overall cost of the final product.

The present invention may be embodied in other specific forms without departing from the true scope of the invention. The described embodiments are to be considered in all respects only as illustrative and not restrictive.

Thus, the present invention is in no way limited to such things as the shape and size of the frame, the shape and size of the resonating structures (including masses, levers, forks, flexures, and pivot flexures), the number of movable masses, the manner in which the resonating structures are mechanically coupled, the number of fingers used for detecting Coriolis accelerations, the manner in which the coriolis detectors are electrically coupled, the manner in which the resonating structures are driven, and the materials and manner in which the gyroscope is produced, among other things.

What is claimed is:

1. A micromachined apparatus comprising:
a frame having a substantially rectangular perimeter;
a plurality of elongated stress relief members arranged substantially in a rectangular pattern outside of the frame perimeter, each stress relief member having at least one substrate anchor substantially at an intersection of said stress relief member with a line through midpoints of a pair of opposite frame sides; and
a plurality of box suspensions coupling corners of the frame to the plurality of stress relief members, each box suspension including a substantially rectangular array of box flexures, the box flexures at a first corner of the array coupled to the frame, the box flexures at a second corner opposite the first corner coupled respectively to ends of a pair of stress relief members but not to one another, the box suspension further including a diagonal brace coupled between third and fourth corners of the array, the box flexures at the second corner further coupled respectively about a pivot point to a plurality of support flexures, the plurality of support flexures having a substrate anchor substantially at an intersection with a line through the first and second corners.

2. The apparatus of claim 1, wherein the frame has a substantially square perimeter and the plurality of elongated stress relief members are arranged substantially in a square pattern outside of the frame perimeter.

3. The apparatus of claim 1, wherein the rectangular array is substantially square.

4. The apparatus of claim 1, wherein the the frame, the elongated stress relief members, and the box flexures are arranged such that a straight line from an intersection point of lines through the midpoints of each pair of opposite frame sides through a corner of the rectangular perimeter also passes through diagonally opposite corners of the rectangular array.

5. The apparatus of claim 1, wherein the plurality of stress relief members consists of four stress relief members, each extending substantially between two pivot points.

6. The apparatus of claim 1, wherein the box flexures are designed to align substantially with a rectilinear grid for defining the apparatus.

7. The apparatus of claim 1, wherein each stress relief member includes a plurality of substrate anchors.

8. The apparatus of claim 1, wherein each stress relief member includes a single elongated substrate anchor.

9. The apparatus of claim 1, wherein the diagonal brace substantially restricts motion of the frame other than rotation of the frame about an intersection point of lines through the midpoints of each pair of opposite frame sides.

10. The apparatus of claim 1, wherein the frame includes finger structures that extend outward toward the stress relief members.

11. The apparatus of claim 10, further comprising:
a plurality of sensing fingers positioned between the frame fingers structures within the space between the frame and the stress relief members.

12. The apparatus of claim 1, wherein the frame, the stress relief members, and the box suspensions are micromachined from a common piece of material.

13. The apparatus of claim 1, wherein the apparatus is a micromachined gyroscope.

14. A micromachined apparatus comprising a substantially rectangular array of box flexures, the box flexures at a first corner of the array coupled to a frame, the box flexures at a second corner opposite the first corner coupled respectively to ends of a pair of stress relief members but not to one another, the apparatus further including a diagonal brace coupled between third and fourth corners of the array, the box flexures at the second corner further coupled respectively at a pivot point to a plurality of support flexures, the plurality of support flexures having a substrate anchor substantially at an intersection with a line through the first and second corners.

15. The apparatus of claim 14, wherein the rectangular array is substantially square.

16. The apparatus of claim 14, wherein the box flexures are designed to align substantially with a rectilinear grid for etching the box flexures.

17. The apparatus of claim 14, wherein the diagonal brace substantially restricts motion of the frame other than rotation of the frame about an intersection point of lines through midpoints of each of a pair of opposite frame sides.

18. A method for reducing stresses in a micromachined apparatus, the method comprising:
forming a plurality of micromachined structures from a common material, the micromachined structures including a frame suspended from a plurality of stress relief members by a plurality of box suspensions, each box suspension including a substantially rectangular array of box flexures, the box flexures at a first corner of the array coupled to the frame, the box flexures at a second corner opposite the first corner coupled respectively to ends of a pair of stress relief members but not to one another, the box suspension further including a diagonal brace coupled between third and fourth corners of the array, the box flexures at the second corner further coupled respectively about a pivot point to a plurality of support flexures;

anchoring each of the plurality of stress relief members to a substrate substantially at an intersection of the stress relief member with a line through centers of opposite sides of the frame; and anchoring the support flexures of each of the plurality of box suspensions to the substrate using a single anchor substantially at an intersection with a line through opposite corners of the frame.

19. The method of claim 18, wherein the rectangular array is substantially square.

20. The method of claim 18, wherein the plurality of stress relief members consists of four stress relief members, each extending substantially between two pivot points.

21. The method of claim 18, wherein the box flexures are designed to align substantially with a rectilinear grid for etching the box flexures.

22. The method of claim 18, wherein the diagonal brace substantially restricts motion of the frame other than rotation of the frame about an intersection point of lines through midpoints of each of a pair of opposite frame sides.

23. A micromachined apparatus comprising:
a substrate;
a frame supporting a number of resonating structures;
suspension means for suspending the frame over and parallel to the substrate, the suspension means substantially restricting movement of the frame relative to the substrate to only rotational movement about an axis normal to the substrate; and
stress reducing means for reducing stresses in the suspension means, wherein the suspension means comprises a plurality of box suspensions, each box suspension coupled at a corner of the frame and including a diagonal brace.

24. The apparatus of claim 23, wherein the stress reducing means comprises:
a plurality of stress reducing members, each stress reducing member anchored to the substrate substantially at an intersection point with a line through the center of opposite frame sides.

* * * * *

UNITED STATES PATENT AND TRADEMARK OFFICE
CERTIFICATE OF CORRECTION

PATENT NO. : 7,089,792 B2
APPLICATION NO. : 10/646332
DATED : August 15, 2006
INVENTOR(S) : John A. Geen It is certified that error appears in the above-identified patent and that said Letters Patent is hereby corrected as shown below:

On title page, item 73 Assignee
  replace "Analod"
  with --Analog--.

Col. 18, line 23
  replace "fingers"
  with --finger--.

Signed and Sealed this

Thirty-first Day of October, 2006

JON W. DUDAS
*Director of the United States Patent and Trademark Office*